US012769860B2

(12) United States Patent
Boutcher et al.

(10) Patent No.: US 12,769,860 B2
(45) Date of Patent: Oct. 20, 2026

(54) SECURE DATA TRANSFER

(71) Applicant: DK Crown Holdings Inc., Boston, MA (US)

(72) Inventors: Bradley Tucker Boutcher, Danvers, MA (US); Jeremy Matthew Hill, Plantation, FL (US)

(73) Assignee: DK Crown Holdings Inc., Boston, MA (US)

( * ) Notice: Subject to any disclaimer, the term of this patent is extended or adjusted under 35 U.S.C. 154(b) by 141 days.

(21) Appl. No.: 18/794,996

(22) Filed: Aug. 5, 2024

(65) Prior Publication Data

US 2026/0037657 A1 Feb. 5, 2026

(51) Int. Cl.

*G06F 21/00* (2013.01)
*G06F 21/62* (2013.01)
*H04L 9/08* (2006.01)

(52) U.S. Cl.

CPC ............ *G06F 21/6218* (2013.01); *H04L 9/08* (2013.01)

(58) Field of Classification Search

CPC .... G06F 21/6218; G06F 21/602; G06F 21/10; G06F 21/6245; G06F 21/72; G06F 21/1014; G06F 11/1469; G06F 3/062; H04L 9/08; H04L 9/0822; H04L 2463/102

See application file for complete search history.

(56) References Cited

U.S. PATENT DOCUMENTS

| | | | | |
|---|---|---|---|---|
| 10,491,576 | B1 * | 11/2019 | Pfannenschmidt | H04L 9/14 |
| 11,822,699 | B1 * | 11/2023 | Heart | G06F 21/629 |
| 12,367,146 | B1 * | 7/2025 | Boles | G06F 12/0831 |
| 12,518,034 | B2 * | 1/2026 | Boesgaard | G06F 21/6209 |
| 12,542,660 | B2 * | 2/2026 | Nix | H04L 9/0861 |
| 2011/0305342 | A1 * | 12/2011 | Manaka | G06F 21/10 380/286 |
| 2014/0013452 | A1 * | 1/2014 | Aissi | G06F 21/602 726/30 |
| 2022/0400006 | A1 * | 12/2022 | Hunsberger | H04W 12/041 |

* cited by examiner

*Primary Examiner* — Tri M Tran

(74) *Attorney, Agent, or Firm* — Wash Park IP Ltd.; John T Kennedy

(57) ABSTRACT

Devices, systems and processes are for described for migrating controlled data from an existing controlled data environment (CDE) to a new CDE. A process includes generating first security keys that include a first public key (1PUK) and a first private key (1PRK), generating an encryption context (EC), generating, based on the EC, second security keys that include an encrypted and an unencrypted $2^{nd}$ Key (u2SEK); encrypting, using the u2SEK, the 1PRK to generate an encrypted 1PRK; generating a migration request which transfers controlled data from an existing data store to a new data store (NDS); communicating, by the new CDE, the migration request and the 1PUK to the existing CDE; receiving the transfer file from the existing CDE; decrypting the transfer file; and storing the transfer file in the NDS. The existing CDE utilizes the 1PUK to encrypt the controlled data and output encrypted controlled data in a transfer file.

17 Claims, 9 Drawing Sheets

SECURE DATA TRANSFER

TECHNICAL FIELD

The technology described herein generally relates to devices, systems, and processes for securely migrating encrypted data from a first data storage environment to a second data storage environment. More specifically, the technology described herein relates to storing, migrating, and use of data that complies with the payment card industry ("PCI") standards—such standards being promulgated by the PCI Security Standards Council, which is headquartered in Wakefield, MA USA.

BACKGROUND

Vendors commonly will store in their databases various data regarding users (their customers, vendors, trade partners, or the like) (herein, collectively "user data"). Such user data (UD) may include personally identifiable data (PID), which may be presented in a humanly perceivable form as personally identifiable information (PII) that credit and debit card agencies require to be PCI compliant. PCI compliance commonly includes compliance with, at least, PCI's standards including at least: a data security standard (PCI DSS), a point-to-point encryption standards (P2PE), a secure software standard, a secure software lifecycle (Secure SLC), and a pin transaction security (PTS) point of interaction (POI) standard, and other standards.

Non-limiting examples of such PCI data includes card numbers (e.g., a credit card may be assigned an eight digit number such as "1234-5378-9012-3456"), card expiration data (e.g., "01/01/2031"), card holder name (e.g., Joe Smith), security code (e.g., "123"), pin and the like. The PID may also commonly include non-public data about the user including demographic data (such as a user's date of birth, social security number, mailing address, or the like), psychographic data (such as a user's preferences), financial data (such as a user's financial data with non-limiting examples including credit rating, credit limit, credit history, bank account(s)), and other forms of data that may identify a given user and/or a collection of two or more users. The storage and dissemination of such PID must comply with the PCI standards in order for a vendor to be PCI compliant and permitted to process credit card, debit card and other electronic payment transactions.

Often a vendor will obtain PCI compliance by strictly limiting when PID may or may not be disclosed to others. Such efforts commonly include the use of secure data environments which encrypt the PID (and other data). Access to the encryption and decryption codes (herein, "security codes") is also tightly controlled.

For many vendors, numerous instances of user PID may be stored by the vendor in an Existing PCI compliant Controlled Data Environment (herein, an "EPCI-CDE"). As used herein, "numerous" means more than ten thousand (10,000) unique instances of PID. Often a first vendor may have millions of users and thus millions of unique instances of PID stored and managed in and by the EPCI-CDE.

Occasionally, a need arises to transfer one or more instances of the PID from the EPCI-CDE to a New PCI compliant Controlled Data Environment (herein, an "NPCI-CDE"). The NPCI-CDE may be provided by and/or associated with a new vendor, a new environment (e.g., a new server farm), a new use (e.g., a new product or service that is facilitated by a different controlled data environment), or otherwise. Given the PCI requirements of maintaining a given level of security (as set forth by the PCI standards) regarding the storage, transfer, use, and other activities vis-à-vis PID, including regulations governing the storage of such PID on both the EPCI-CDE and on the NPCI-CDE, encryption and other data security requirements while the PID is transferred from the EPCI-CDE to the NPCI-CDE, and otherwise, devices, systems and processes are needed that can facilitate such data transfers while maintaining PCI compliance throughout the data transfer, storage (both existing and new), and later use of the PID by the new vendor (and/or vendor system).

Further, given the numerous instances of users and PID associated with a given vendor, and the fact that a set of the numerous instances of PID may be relevant to the new vendor, devices, systems and methods are needed for filtering and/or otherwise identifying subsets of the numerous user instances of PID when a transfer of the PID is to occur from the EPCI-CDE to the NPCI-CDE.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. A more extensive presentation of features, details, utilities, and advantages of various implementations of the present disclosure is provided in the following written description and illustrated in the accompanying drawings.

Various implementations are described of devices, systems, and processes for storing, migrating and using numerous instances of user PII data.

In accordance with at least one implementation of the present disclosure, a system of one or more computers can be configured to perform particular operations or actions by virtue of having software, firmware, hardware, or a combination thereof installed on the system that, in operation, cause(s) the system to perform the actions. One or more computer programs can be configured to perform particular operations or actions by virtue of including instructions that, when executed by a data processing apparatus, cause the apparatus to perform the actions.

For at least one implementation of the present disclosure, a process for migrating controlled data from an existing controlled data environment (CDE) to a new CDE, may include: generating first security keys ($1^{st}$ Keys), wherein the $1^{st}$ Keys may include a first public key (1PUK) and a first private key (1PRK); generating an encryption context (EC); generating, based on the EC, second security keys ($2^{nd}$ Keys), wherein the $2^{nd}$ Keys may include an encrypted $2^{nd}$ Key (e2SEK) and an unencrypted $2^{nd}$ Key (u2SEK). The process may further include encrypting, using the u2SEK, the 1PRK to generate an encrypted 1PRK ("e1PRK") and generating a migration request. The migration request may request transfer of controlled data from an existing data store (EDS) to a new data store (NDS). For at least one implementation, the EDS is controlled by the existing CDE and the NDS is controlled by the new CDE. The process may further include communicating, by the new CDE, the migration request and the 1PUK to the existing CDE. The existing CDE may utilize the 1PUK to encrypt the controlled data and output encrypted controlled data in a transfer file. The process may further include receiving the transfer file from the existing CDE and, upon receiving the transfer file, decrypting the transfer file and storing the transfer file in the NDS.

For at least one implementation of the process, the $1^{st}$ Keys may be asymmetrical keys and the $2^{nd}$ Keys may be symmetrical keys.

For at least one implementation of the process, the $2^{nd}$ Keys may be generated by a key management system (KMS) and the KMS may be operated independently of the existing CDE and the new CDE.

For at least one implementation of the process, the EC may identify the NDS as a designated storage location for the transfer file.

For at least one implementation of the process and after the operation of encrypting the 1PRK to generate the e1PRK, the process may further include: discarding the 1PRK; storing the e1PRK in a staging vault controlled by the new CDE; and storing the e2SEK in the staging vault.

For at least one implementation of the process, the receiving of the transfer may further include: receiving, by the new CDE from the existing CDE, a message indicating that a first transfer of the transfer file from an existing CDE data store (EDS) to a first secure file transfer data store (1SFT) associated with the existing CDE has occurred; second instructing the 1SFT to second transfer the transfer file from the 1SFT to a second secure file transfer data store (2SFT) associated with the new CDE; and third instructing the 2SFT to third transfer the transfer file from the 2SFT to a staging vault associated with the new CDE.

For at least one implementation of the process, the encrypted controlled data in the transfer file may include corresponding user data (CUD). The CUD may include user data (UD) filtered, by the existing CDE, from multiple UD entries provided in the EDS and UD that corresponds to at least one criteria specified in the migration request.

For at least one implementation of the process, the encrypted controlled data in the transfer file includes corresponding user data (CUD) set forth in two or more rows. Each row of the two or more rows may include personally identifiable data (PID) for a given user. The PID may include data that is payment card industry (PCI) compliant. The existing CDE may be an existing PCI Compliant Controlled Data Environment (EPCI-CDE) and the new CDE may be a new PCI Compliant Controlled Data Environment (NPCI-CDE). The transfer file may be a PCI compliant transfer file (PTF).

For at least one implementation of the process, the process may include decrypting of the transfer file, using a second instance of the 1PRK (1PRK-2), to generate a second instance of the controlled data. The process may further include: generating third security keys ("$3^{rd}$ Keys"). The process may further include, for a given row of the two or more rows in the transfer file: separately decrypting the given row to generate a given row of unencrypted CUD; re-encrypting, using the $3^{rd}$ Keys, the given row of unencrypted CUD to generate a given $3^{rd}$ Key encrypted row of CUD; storing the given $3^{rd}$ Key encrypted row of CUD in a staging vault (SV); publishing a row identifier (RID) for the, as stored, given $3^{rd}$ Key encrypted row of CUD; and repeating the operations above for each of the two or more rows.

For at least one implementation of the process, the $3^{rd}$ Keys may be symmetric keys and include an encrypted $3^{rd}$ Key (e3SEK) and an unencrypted $3^{rd}$ Key (u3SEK).

For at least one implementation of the process, the third transfer of the transfer file may further include: segmenting the transfer file into two or more chunks. A given chunk of the two or more chunks may include at least one row of the two or more rows in the transfer file. For at least one implementation of the process, each row includes personally identifiable data (PID) for a given user.

For at least one implementation of the process and with respect to at least one given row of the two or more rows in the transfer file, the process may include: reading the RID; retrieving, from the SV, the given $3^{rd}$ Key encrypted row of CUD; decrypting, using the $3^{rd}$ Keys, the given $3^{rd}$ Key encrypted row of CUD, to re-generate the given row of unencrypted CUD; obtaining a new account number (NAN) for the given RID; generating fourth security keys ($4^{th}$ Keys); encrypting, using the $4^{th}$ Keys, the given row of unencrypted CUD to generate a given $4^{th}$ Key encrypted row of CUD; and storing the given $4^{th}$ Key encrypted row of CUD in the NDS.

For at least one implementation of the process, the $4^{th}$ Keys may be symmetric keys and may include an encrypted $4^{th}$ Key (e4SEK) and an unencrypted $4^{th}$ Key (u4SEK).

For at least one implementation of the process and with respect to at least one given row of the two or more rows in the transfer file, the process may include: retrieving the given $4^{th}$ Key encrypted row of CUD from the NDS; decrypting, using the $4^{th}$ Keys, the given $4^{th}$ Key encrypted row of CUD to generate user instrument data (UID); generating, from the UID, a payment instrument fingerprint (PIF); transmitting the PIF to a PIF data store (PIFDS); generating fifth security keys ($5^{th}$ Keys); encrypting the PIF, using the $5^{th}$ Keys, to generate an encrypted PIF (ePIF); and storing the ePIF in the SV.

For at least one implementation of the process, the $5^{th}$ Keys may be symmetric keys and may include an encrypted $5^{th}$ Key (e5SEK) and an unencrypted $5^{th}$ Key (u5SEK).

For at least one implementation of the process, the process may include: receiving at least one operational parameter (OPPS) for the new CDE. The EC may be generated based on the OPPS.

For at least one implementation of the process, the process may include: generating a globally unique identifier for an encrypted storage token (EST); storing, based on the EST, the e2SEK and the e1PRK; and storing, based on the OPPS, the EST in the NDS.

For at least one implementation of the process, the process may further include: retrieving, based on the EST, the e2SEK and the e1PRK; generating, based on the OPPS, generating a second instance of the EC (EC-2); and generating a second instance of the u2SEK (u2SEK-2) based on the EC-2. For at least one implementation, the decrypting of the transfer file may further include: decrypting, using the u2SEK-2, the e1PRK to generate a second instance of the 1PRK (1PRK-2); and decrypting the transfer file, using the 1PRK-2, to generate a second instance of the controlled data. The storing of the transfer file in the NDS may further comprise storing the second instance of the controlled data in the NDS.

BRIEF DESCRIPTION OF THE DRAWINGS

The features, aspects, advantages, functions, modules, and components of the devices, systems, and processes provided by the various implementations of the present disclosure are further disclosed herein regarding at least one of the following descriptions and accompanying drawing figures. In the appended figures, similar components or elements of the same type may have the same reference number and may include an additional alphabetic designator, such as 108*a*-108*n*, and the like, wherein the alphabetic designator indicates that the components bearing the same reference number, e.g., 108, share common properties and/or characteristics. Further, various views of a component may be distinguished by a first reference label followed by a dash and a second reference label, wherein the second reference label is used for purposes of this description to designate a view of the component. When the first reference label is used in the specification, the description is applicable to any of the similar components and/or views having the same first reference label irrespective of any additional alphabetic designators or second reference labels, if any.

DETAILED DESCRIPTION

Figure 1A:
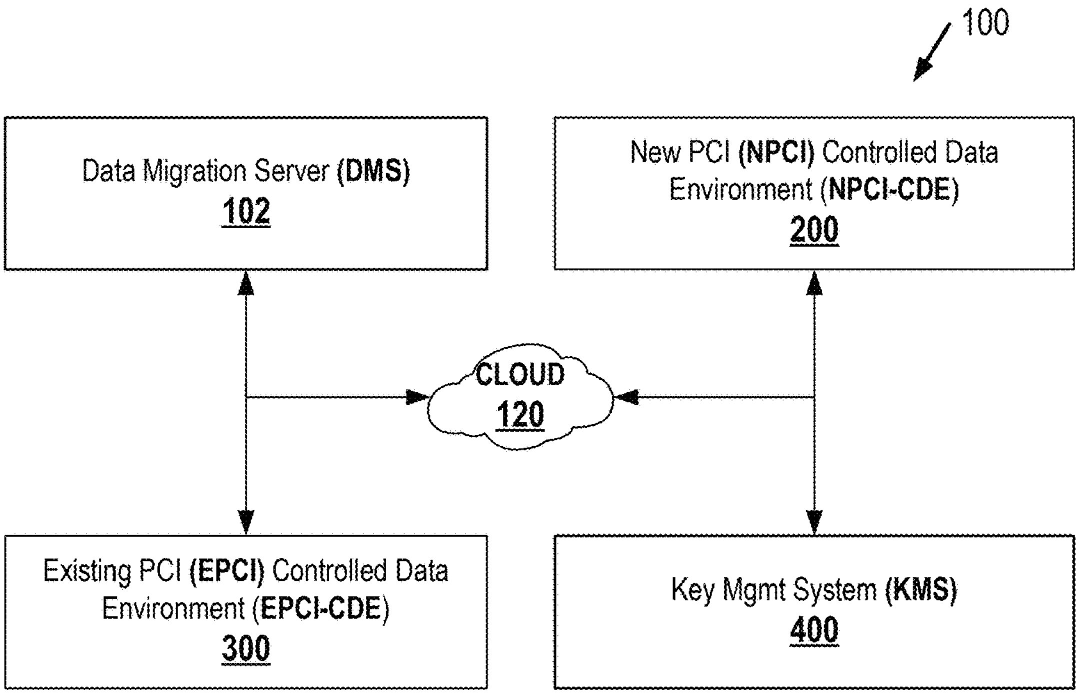
FIG. 1A is a schematic illustration of a secure PID data migration system and in accordance with at least one implementation of the present disclosure.

Various implementations of the present disclosure describe devices, systems, and processes for PCI compliant migration of numerous instances PID from an EPCI-CDE to an NPCI-CDE.

"Additional I/O interface" (AIOI) herein refers to one or more components, provided with or coupled to a device, configured to support a receiving and/or presenting of additional inputs and outputs to and from one or more users. An AIOI may be configured to support the receiving and presenting of the additional I/O content (AIO) to users. Herein, the AIO, as communicated, may be referred to as "AIO signals." An AIO signal may include an audible signal or a visible signal and may be communicated separately or collectively therewith. An AIOI may include any interface not otherwise categorized as an Audio I/O interface or a Visual I/O interface with non-limiting examples including touch pads, keyboards, sensors, motion detectors, tactile elements, and the like. Any known or later arising technologies configured to convey information to or from one or more users as an AIO signal may be utilized for at least one implementation of the present disclosure. An AIOI includes hardware and computer instructions (herein, "AIO technologies") which supports the input and output of other signals with a user.

"Application" herein refers to a set of computer instructions that configure one or more processors to perform one or more tasks that are other than tasks commonly associated with the operation of the processor itself (e.g., a "system software," an example being an operating system software), or the providing of one or more utilities provided by a device (e.g., a "utility software," an example being a print utility). An application may be bundled with a given device or published separately. Non-limiting examples of applications include word processing applications (e.g., Microsoft WORD™), video streaming applications (e.g., SLINGTV™), video conferencing applications (e.g., ZOOM™), gaming applications (e.g., FORTNITE™), and the like.

"AI/ML" (Artificial Intelligence/Machine Learning) herein refers to the use of one or more supervised learning, unsupervised learning, and/or refinement learning processes (as executed by one or more processors which may include processors associated with one or more neural networks) to perform one or more of the operations of the various computer engines described herein.

"Audio I/O interface" herein refers to one or more components, provided with or coupled to an electronic device, configured to support a receiving and/or presenting of humanly perceptible audible content to one or more users. Such audible content (which is also referred to herein as being "audible signals") may include spoken text, sounds, or any other audible information. Such audible signals may include one or more humanly perceptible audio signals, where humanly perceptible audio signals typically arise between 20 Hz and 20 KHz. The range of humanly perceptible audio signals may be configurable to support an audible range of a given individual user. An audio I/O interface includes hardware and computer instructions (herein, "audio technologies") which supports the input and output of audible signals to a user. Such audio technologies may include, but are not limited to, noise cancelling, noise reduction, technologies for converting human speech to text, text to speech, translation from a first language to one or more second languages, playback rate adjustment, playback frequency adjustment, volume adjustments and otherwise. An audio I/O interface may use one or more microphones and speakers to capture and present audible signals respectively from and to a user. Such one or more microphones and speakers may be provided by a given device itself or by a device communicatively couple additional audible device component. For example, earbuds may be communicatively coupled to a smartphone, with the earbuds functioning as an audio I/O interface and capturing and presenting audio signals as sound waves to and from a user, while the smartphone functions as a UD. An audio I/O interface may be configured to automatically recognize, and capture comments spoken by a user and intended as audible signals for sharing with other users, inputting commands, or otherwise.

"Bus" herein refers to any known and/or later arising technologies which facilitate the transfer of data within and/or between devices. Non-limiting examples include Universal Serial Bus (USB), PCI-Express, Compute Express Link (CXL), IEEE-488 bus, High Performance Parallel Interface (HIPPI), and the like.

"Cloud" herein refers to cloud computing, cloud storage, cloud communications, and/or other technology resources which a given user does not actively manage or provide. A usage of a Cloud resource may be private (limited to various users and/or uses), public (available for multiple users and/or uses), hybrid, dedicated, non-dedicated, or otherwise. It is to be appreciated that implementations of the present disclosure may use Cloud resources to provide for processing, storage and other functions related to facilitating pricing of betting lines which account for changes in probabilities occurring due to fixture variations during an event. An implementation may utilize Cloud resources using any known or later arising data delivery, processing, storage, virtualization, or otherwise technologies, standards, protocols (e.g., the Simple Object Access Protocol (SOAP), the Hyper Text Transfer Protocol (HTTP), Representational State Transfer protocol (REST), the KAFKA protocol, as provided by the Apache Software Foundation and as further described at https://kafka.apache.org/documentation/#introduction (the contents of which are incorporated herein by reference), or the like. Non-limiting examples of such technologies include Software as a Service (SaaS), Platform as a Service (Paas), Infrastructure as a Service (Iaas), and the like. Cloud resources may be provided by one or more entities, such as AMAZON WEB SERVICES provided by Amazom.com Inc., AZURE provided by Microsoft Corp., and others.

"Communications Interface/Network Interface" herein refers to one or more separately provided components and/or integrated with other components of a Device that is configured to facilitate communication of data with one or more other devices using a Coupling. Non-limiting examples of communications interfaces including networking cards, Wi-Fi™ modules, Ethernet ports, Bluetooth radio modules, wireless radio modules, and the like. Any known or later arising components, technologies, protocols, communications mediums, or the like may be used as a communications interface in a given device in an ETS.

"Computer engine" (or "engine") herein refers to a combination of a processor and computer instruction(s). A computer engine executes computer instructions to perform one or more logical operations (herein, a "logic") which facilitate various actual (non-logical) and tangible features and function provided by a system, a device, and/or combinations thereof.

"Content" herein refers to data that that may be presented, using a suitable presentation device, to a user in a humanly perceptible format. When presented to a human, the data becomes "information." Non-limiting examples of content include gaming images and graphics such as those related to bet placement, or otherwise. Content may include, for example and not by limitation, one or more sounds, images, video, graphics, gestures, or otherwise. The content may originate from any source, including live and/or recorded, augmented reality, virtual reality, computer generated, or otherwise. The content may be presented to a given user using any user device and any user interface. Content may be stored, processed, communicated, or otherwise utilized.

"Coupling" herein refers to the establishment of a communications link between two or more elements of a given system. A coupling may utilize any known and/or later arising communications and/or networking technologies, standards, protocols or otherwise. Non-limiting examples of such technologies include packet switch and circuit switched communications technologies, with non-limiting examples including, Wide Area Networks (WAN), such as the Internet, Local Area Networks (LAN), Public Switched Telephone Networks (PSTN), Plain Old Telephone Service (POTS), cellular communications networks such as a 3G/4G/5G or other cellular network, IoT networks, Cloud based networks, private networks, public networks, or otherwise. One or more communications and networking standards and/or protocols may be used, with non-limiting examples including, the TCP/IP suite of protocols, ATM (Asynchronous Transfer Mode), the Extensible Message and Presence Protocol (XMPP), Voice Over IP (VOIP), Ethernet, Wi-Fi, CDMA, Z-WAVE, Near Field Communications (NFC), GSM/GRPS, TDMA/EDGE, EV/DO, WiMAX, SDR, LTE, MPEG, BLUETOOTH, and others. A coupling may include use of physical data processing and communication components. A coupling may be physically and/or virtually instantiated. Non-limiting examples of physical network components include data processing and communications components including computer servers, blade servers, switches, routers, encryption components, decryption components, and other data security components, data storage and warehousing components, and otherwise. Any known or later arising physical and/or virtual data processing and/or communications components may be utilized for a given coupling.

"Data" (which is also referred to herein as a "computer data") herein refers to any representation of facts, information or concepts in a form suitable for processing, storage, communication, or the like by one or more electronic device processors, data stores, routers, gateways, or other data processing and/or communications devices and systems. Data, while and/or upon being processed, may cause or result in an electronic device or other device to perform at least one function, task, operation, provide a result, or otherwise. Data may be communicated, processed, stored and/or otherwise exist in a transient and/or non-transient form, as determined by any given state of such data, at any given time. For a non-limiting example, a given data packet may be non-transient while stored in a storage device, but transient during communication of the given data packet from a first device or system to a second (or more) device or system. When received and stored in memory, data storage device, or otherwise, the given data packet has a non-transient state. For example, and not by limitation, data may take any form including as one or more applications, content, or otherwise. Instructions, as further described herein, are a form of data.

"Data store" herein refers to any device or combinations of devices configured to store data on a temporary, permanent, non-transient, non-transitory, or other basis. A data store is also referred to herein as a "computer readable medium." A data store may store data in any form, such as electrically, magnetically, physically, optically, or otherwise. A data store may include a memory devices, with non-limiting examples including random access memory (RAM) and read only memory (ROM) devices. A data store may include one more storage devices, with non-limiting examples including electrical storage drives such as EEPROMs, Flash drives, Compact Flash (CF), Secure Digital (SD) cards, Universal Serial Bus (USB) cards, and solid-state drives, optical storage drives such as DVDs and CDs, magnetic storage drives such as hard drive discs, magnetic drives, magnetic tapes, memory cards, and others. Any known or later arising memory and data storage device technologies may be utilized for a given data store. Available storage provided by a given one or more data stores may be partitioned or otherwise designated by the storage controller as providing for permanent storage and temporary storage. Non-transient and/or non-transitory data, computer instructions, or other the like may be suitably stored in a data store. As used herein, permanent storage is distinguished from temporary storage, with the latter providing a location for temporarily storing data, variables, or other instructions used for a then arising or soon to arise data processing operations. A non-limiting example of a temporary storage is a memory component provided with and/or embedded onto a processor or integrated circuit provided therewith for use in performing then arising data calculations and operations. Accordingly, it is to be appreciated that a reference herein to "temporary storage" is not to be interpreted as being a reference to transient or transitory storage of data. Permanent storage and/or temporary storage may be used to store transient, transitory, non-transient, and non-transient data with the data, while stored, being herein deemed to be non-transitory data.

"Device" and "electronic device" herein refer to any known or later arising electrical device configured to, singularly and/or in combination, communicate, manipulate, output for presentation as information to a human, process, store, or otherwise utilize data. Non-limiting examples of devices include user devices and servers.

"Instruction" (which is also referred to herein as a "computer instruction") herein refers to a non-transitory processor executable instruction, associated data structures, sequence of operations, program modules, or the like. An instruction is described by an instruction set. It is commonly appreciated that instruction sets are often processor specific and accordingly an instruction may be executed by a processor in an assembly language or machine language format that is translated from a higher level programming language. An instruction may be provided using any form of known or later arising programming; non-limiting examples including declarative programming, imperative programming, functional programming, procedural programming, stack based programming, object-oriented programming, and otherwise. An instruction may be performed by using data and/or content stored in a data store on a transient, non-transient, transitory and/or non-transitory basis, as may arise for any given data, content and/or instruction. While the data for one or more instructions is being utilized, such use is herein deemed to occur on a non-transient and non-transitory basis.

"Module" herein refers to and, when claimed, recites definite structure for an electrical/electronic device that is configured to provide at least one feature and/or output signal and/or perform at least one function including the features, output signals and functions described herein. A module may provide the one or more functions using computer engines, processors, computer instructions and the like. When a feature, output signal and/or function is provided, in whole or in part, using a processor, one more software components may be used, and a given module may include a processor configured to execute computer instructions. A person having ordinary skill in the art (a "PHOSITA") will appreciate that the specific hardware and/or computer instructions used for a given implementation will depend upon the functions to be accomplished by a given module. Likewise, a PHOSITA will appreciate that such computer instructions may be provided in firmware, as embedded software, provided in a remote and/or local data store, accessed from other sources on an as-needed basis, or otherwise. Any known or later arising technologies may be used to provide a given module and the features and functions supported therein.

"Power Supply/Power" herein refers to any known or later arising technologies which facilitate the use of electrical energy by a device. Non-limiting examples of such technologies include batteries, power converters, inductive charging components, line-power components, solar power components, and otherwise.

"Processor" herein refers to one or more known or later developed hardware processors and/or processor systems configured to execute one or more computer instructions, with respect to one or more instances of computer data, and perform one or more logical operations. The computer instructions may include instructions for executing one or more applications, software engines, and/or processes configured to perform computer executable operations. Such hardware and computer instructions may arise in any computing configuration including, but not limited to, local, remote, distributed, blade, virtual, or other configurations and/or system configurations. Non-limiting examples of processors include discrete analog and/or digital components that are integrated on a printed circuit board, as a system on a chip (SOC), or otherwise; Application specific integrated circuits (ASICs); field programmable gate array (FPGA) devices; digital signal processors; general purpose processors such as 32-bit and 64-bit central processing units; multi-core ARM based processors; microprocessors, microcontrollers; and the like. Processors may be implemented in single or parallel or other implementation structures, including distributed, Cloud based, multi-threaded and otherwise.

"Real-time" herein refers to, with respect to a given event and a given activity thereof, a communication of fixture data to an event simulation engine, a selection of a fixture leveled model by the event simulation engine, an execution of thousands of substantially simultaneous simulations using the selected fixture leveled model, a generation and/or updating of one or more betting lines for the given activity, and a communication of the betting lines to a user each individually and collectively occur within a time period which enables the user to review and select or reject one or more betting lines that have been initially generated and/or subsequently updated based upon Fixture data relevant to the given event and activity.

"Security Component/Security Module/Security" herein refers to any known or later arising processor, computer instruction, and/or combination thereof configured to secure data as communicated, processed, stored, or otherwise manipulated. Non-limiting examples of security components include those implement encryption standards, such as an Advanced Encryption Standard (AES), and transport security standards, such as Transport Layer Security (TLS) or Secure Sockets Layer (SSL).

"Server" herein refers to one or more devices that include computer hardware and/or computer instructions that provide functionality to one or more other programs or devices (collectively, "clients"). Non-limiting examples of servers include database servers, file servers, application servers, web servers, communications servers, virtual servers, computing servers, and the like. Servers may be combined into clusters (e.g., a server farm), logically or geographically grouped, or otherwise. Any known or later arising technologies may be used for a server. A server may instantiate one or more computer engines as one or more threads operating on a computing system having a multiple threaded operating system, such as the WINDOWS, LINUX, APPLE OS, ANDROID, and other operating systems, as an application program on a given device, as a web service, as a combination of the foregoing, or otherwise. An Application Program Interface (API) may be used to support an implementation of the present disclosure. A server may be provided in the virtual domain and/or in the physical domain. A server may be associated with a human user, a machine process executing on one or more computing devices, an API, a web service, instantiated on the Cloud, distributed across multiple computing devices, or otherwise. A server may be any electronic device configurable to communicate data using a network, directly or indirectly, to another device, to another server, or otherwise.

"Substantially simultaneous(ly)" herein refers to an absence of a greater than expected and humanly perceptible delay between a first event or condition and a second event or condition. Substantial simultaneity may vary in a range of quickest to slowest expected delay, to a moderate delay, or to a longer delay.

"User Device" herein refers to a device configured for use by a human being to one or more of communicate, present, process, and store data. Non-limiting examples of user devices include smartphones, laptop computers, tablet computing devices, desktop computers, smart televisions, smart glasses, virtual reality glasses, augmented reality glasses, earbuds/headphones and other audible output devices, and other devices.

"User Interface" herein refers to one more components, provided with or coupled to a device configured to receive information from and/or present information to a user. A user interface may include one more Additional I/O interfaces, Audio I/O interfaces, and Visual I/O interfaces.

"Visual I/O interface" herein refers to one or more components, provided with or coupled to a device, configured to support a receiving and/or presenting of humanly perceptible visual content to one or more users. A visual I/O interface may be configured to support the receiving and presenting of visual content (which is also referred to herein as being "visible signals") to users. Such visible signals may be in any form, such as still images, motion images, augmented reality images, virtual reality images, and otherwise. A visual I/O interface includes hardware and computer instructions (herein, "visible technologies") which supports the input by and output of visible signals to users via a device. Such visible technologies may include technologies for converting images (in any spectrum range) into humanly perceptible images, converting content of visible images into a given user's perceptible content, such as by character recognition, translation, playback rate adjustment, playback frequency adjustment, and otherwise. A visual I/O interface may be configured to use one or more display devices, such as an internal display and/or external display for a given device with the display(s) being configured to present visible signals to a user. A visual I/O interface may be configured to use one or more image capture devices to capture content. Non-limiting examples of image capture devices include lenses, cameras, digital image capture and processing software, and the like. Accordingly, it is to be appreciated that any existing or future arising visual I/O interfaces, devices, systems and/or components may be utilized by and/or in conjunction with a device to facilitate the capture, communication and/or presentation of visible signals to a user.

Secure Data Migration System 100

As shown in FIG. 1A and for at least one implementation of the present disclosure, a secure PID migration system ("system") 100 may include: a database migration server (DMS) 102, an NPCI-CDE 200, an EPCI-CDE 300, a key management system (KMS) 400, and one or more networked components that are collectively represented by Cloud 120 and/or other network components that couple the system components. Other servers, databases, communications components and the like may be used in implementations of the system 100.

Data Migration Server (DMS) 102

Figure 1B:
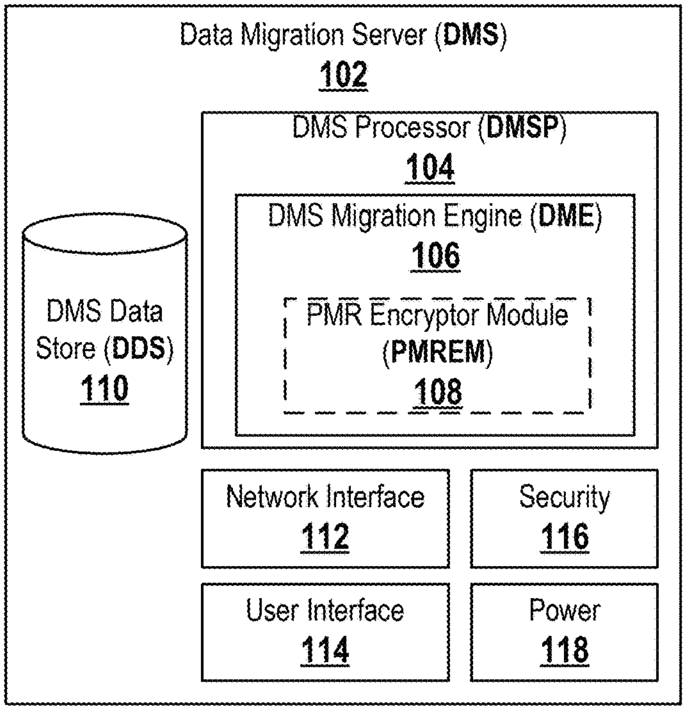
FIG. 1B is a schematic illustration of a data migration server utilized in an implementation of the secure data transfer system of FIGS. 1A and 1*n* accordance with at least one implementation of the present disclosure.
Figure 5:
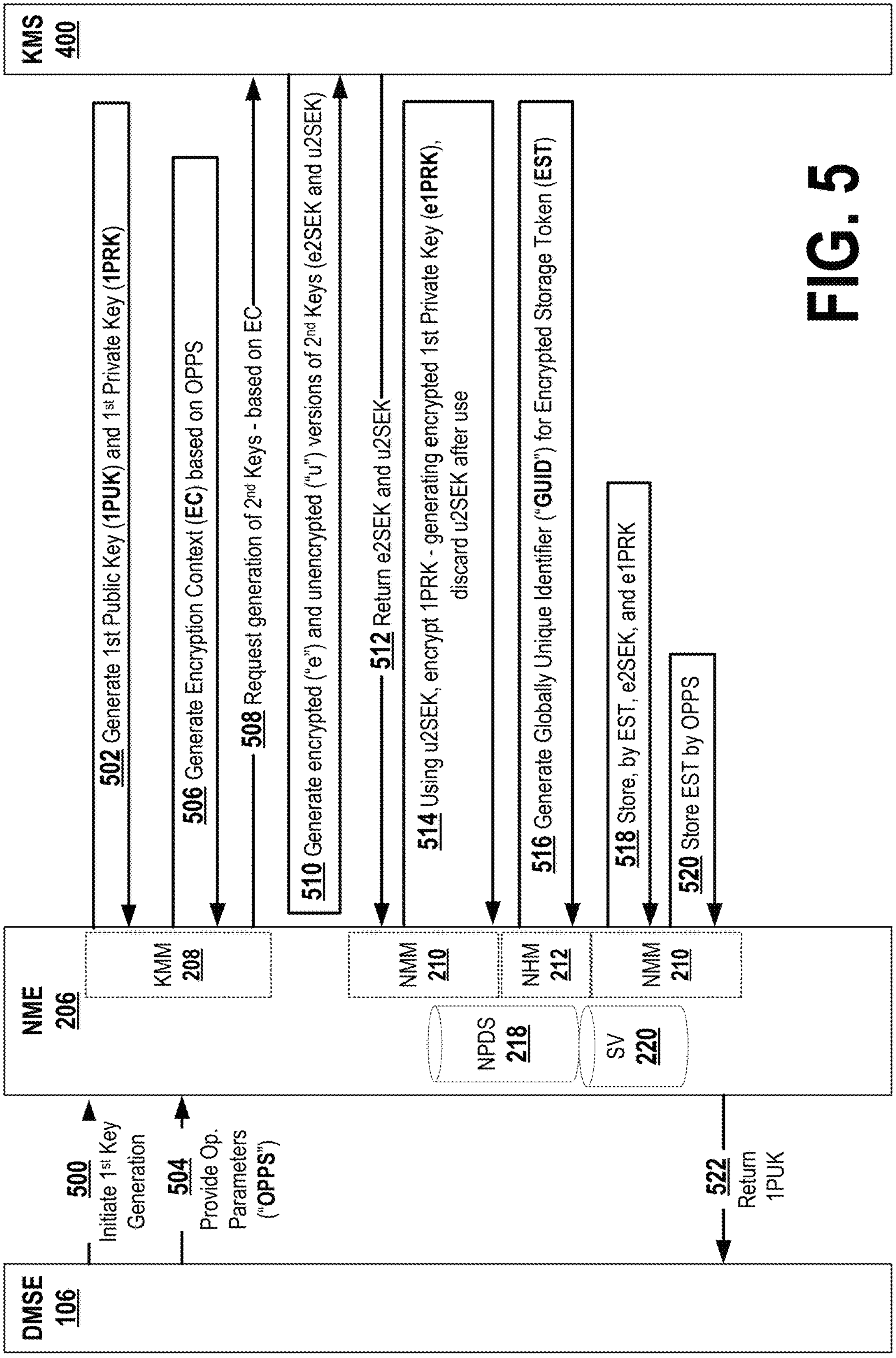
FIG. 5 is a flow chart illustrating a PCI compliant process for generating secure encryption keys utilized when migrating PID from an EPCI-CDE to an NPCI-CDE and in accordance with at least one implementation of the present disclosure.
Figure 6:
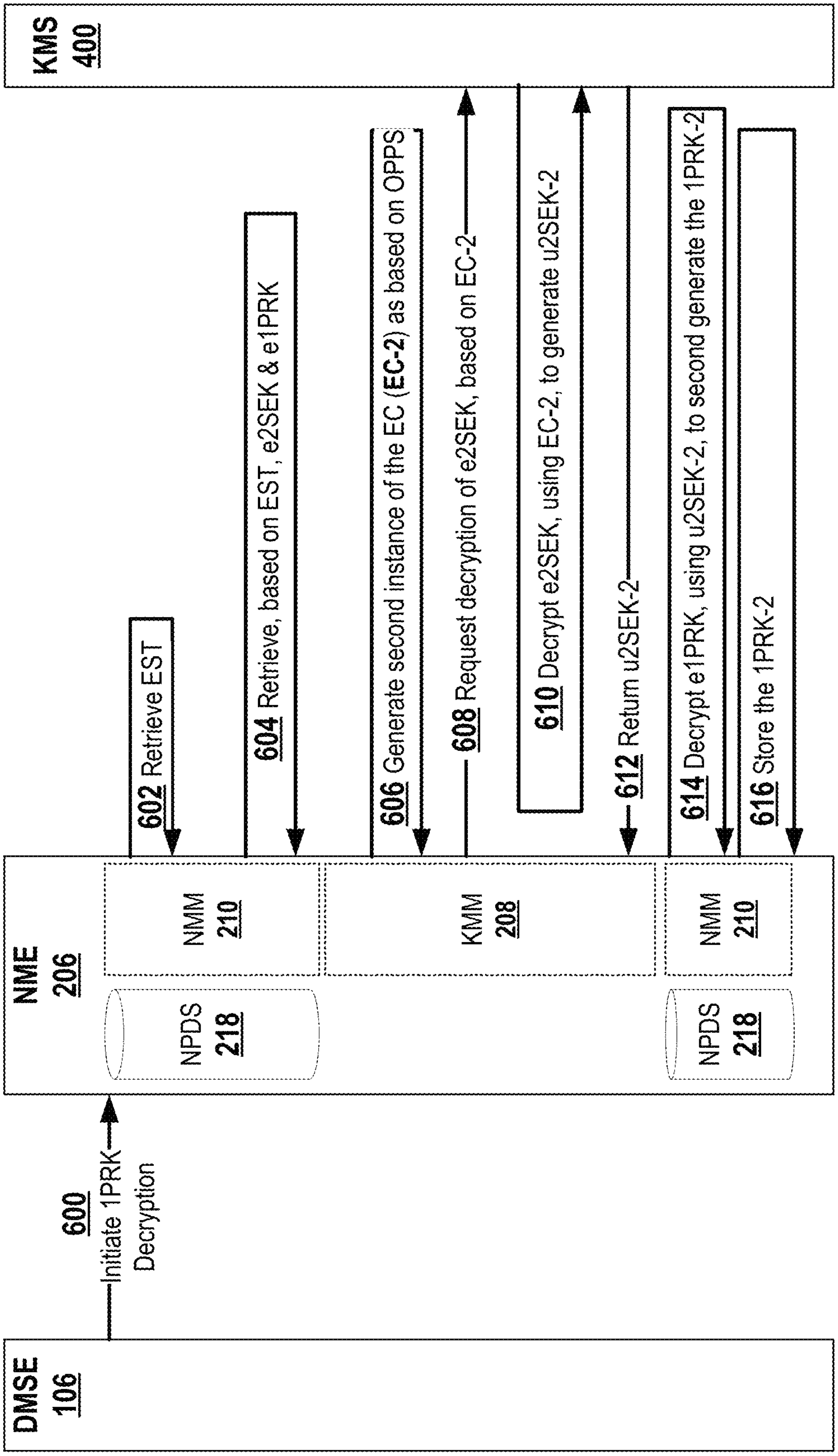
FIG. 6 is a flow chart illustrating a PCI compliant process for generating secure decryption keys utilized when migrating PID from an EPCI-CDE to an NPCI-CDE and in accordance with at least one implementation of the present disclosure.
Figure 7:
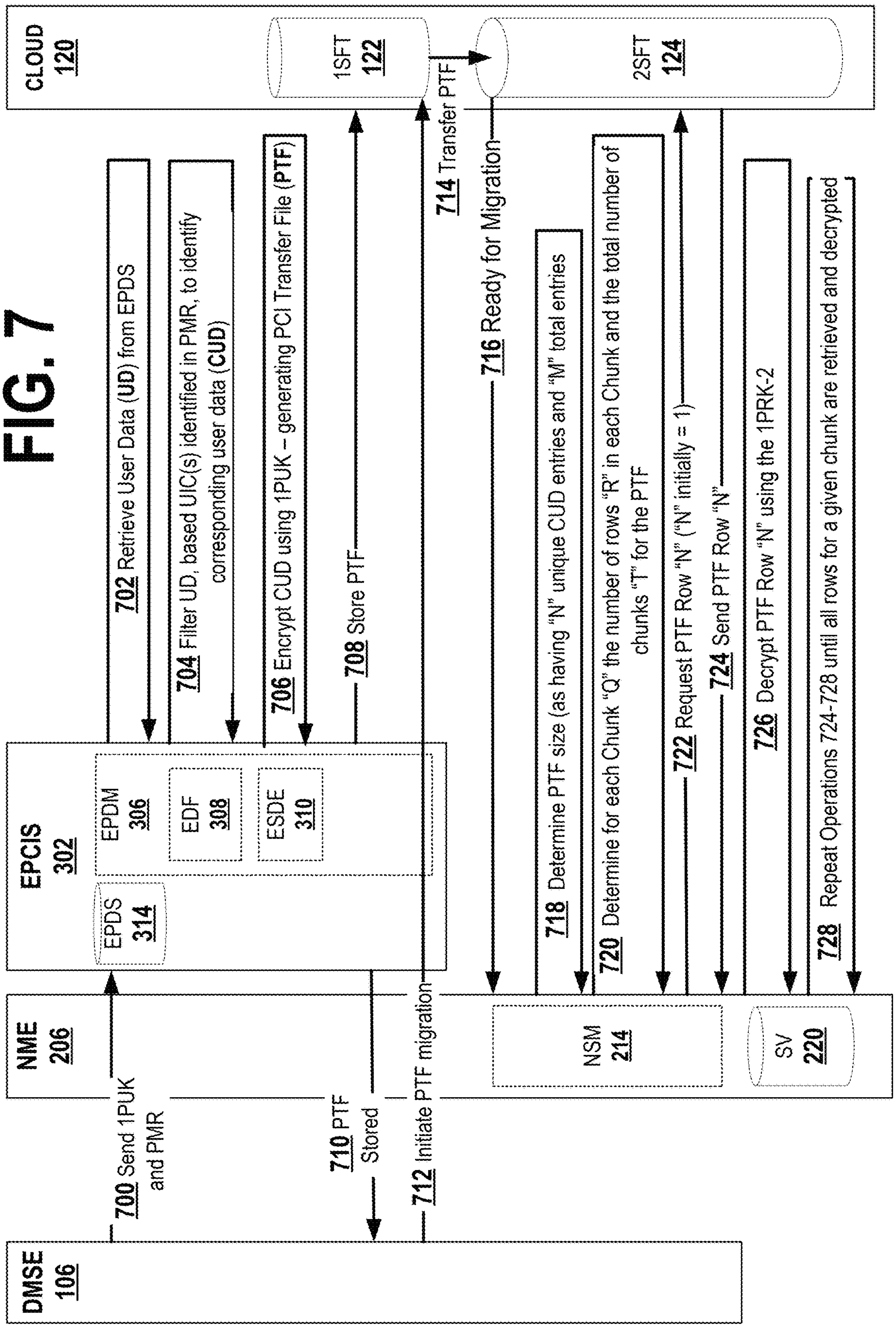
FIG. 7 is a flow chart illustrating a PCI compliant process for migrating PID from an EPCI-CDE to an intermediary server and staging the migration of the PID from the intermediary server to the NPCI-CDE and in accordance with at least one implementation of the present disclosure.

As shown in FIG. 1B and for at least one implementation, the DMS 102 may include a DMS processor (DMSP) 104 that executes computer instructions for instantiating a DMS migration engine (DMSE) 106 that instructs the various system 100 components which of the numerous instances of PID to migrate from the EPCI-CDE 300 to the NPCI-CDE 200. For at least one implementation, the DMSE 106 configures the DMS 102 to identify and request the transfer, from the EPCI-CDE 300, of one or more collections of PID stored in the EPCI-CDE 300. Such request is herein referred to as a PCI Migration Request (PMR). For at least one implementation, a PMR may include a request for all PID in the EPCI-CDE 300 to be migrated to the NPCI-CDE 200. Such identification may include use of one or more user and/or PID descriptors (herein "user descriptors"). For at least one implementation, the user descriptors may correspond to one or more user status categories, user demographics, user psychographics, user financial data profiles, or other user related data (herein individually and collectively a user data category (UDC)). One or more of the operations performed by the DME 106 are illustrated in FIGS. 5, 6 and 7 and are further described below.

For at least one implementation, the DME 106 may be configured to instantiate a PMR encryptor module (PMREM) 108. The PTREM 108 may be configured to encrypt the PMR for transmission from the DMS 102 to the EPCI-CDE 300. As shown in FIG. 1B by the dashed lines, the PMREM 108 is an optional element and may not be used in one or more implementation of the present disclosure. For at least one implementation, a public key-private key encryption protocol may be used to secure the PMR for transmission between the DMS 102 and the EPCI-CDE 300. The keys used for such encryption may be single use, time limited, or otherwise constrained-any known and/or later arising data security protocols may be used to facilitate the secure transmission of the PMR between the DMS 102 and the EPCI-CDE 300. For at least one implementation, the encryption keys may be generated the KMS 400 and one or more of such key may be stored by the KMS 400.

As further shown in FIG. 1B, the DMS 102 may include a DMS Data Store (DDS) 110. The DDS 110 may be configured to non-transitorily store the computer instructions used to instantiate the DME 106, PMREM 108, and/or other data, instructions, and the like for the DMS 102.

As further shown in FIG. 1B, the DMS 102 may include a network interface 112, (as described above), a security component 114 (as described above), a user interface 116 (as described above), power 118 (as described above), a bus (not shown and as described above), and other commonly utilized components for one or more computers and/or computer servers.

Cloud 120

Figure 1C:
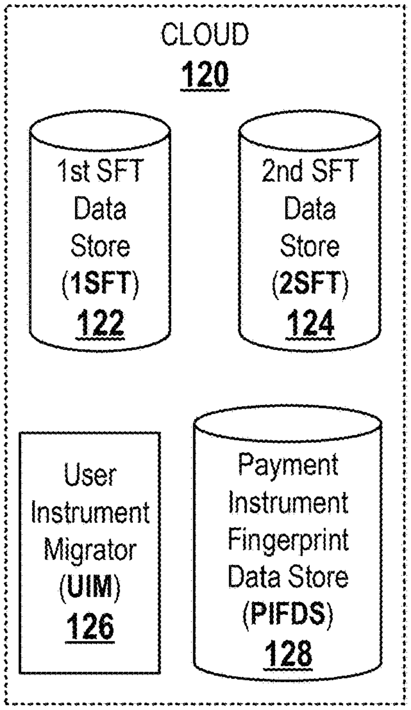
FIG. 1C is a schematic illustration of Cloud based components of the secure data transfer system of FIGS. 1A and 1*n* accordance with at least one implementation of the present disclosure.

As shown in FIG. 1C, the Cloud 120 may include one or more data stores, including a first secure file transfer data store (1SFT) 122 and a second secure file transfer data store (2SFT) 124. One or more of the operations performed by the 1SFT 122 and the 2SFT 124 are illustrated in FIG. 7 and are further described below.

Figure 8:
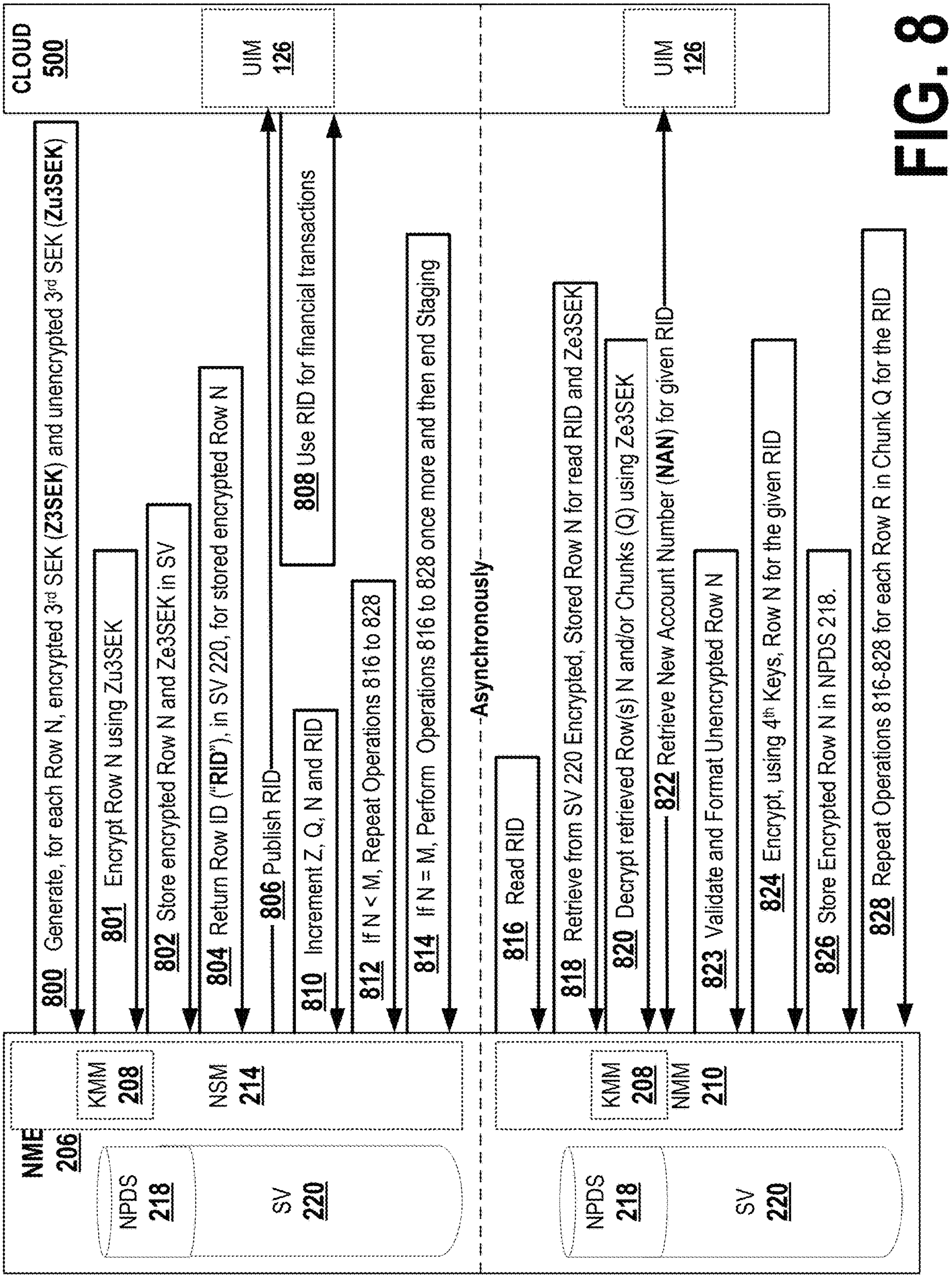
FIG. 8 is a flow chart illustrating a PCI compliant process for migrating PID from the intermediary server of FIG. 7 to the NPCI-CDE, using a staged migration process, and in accordance with at least one implementation of the present disclosure.
Figure 9:
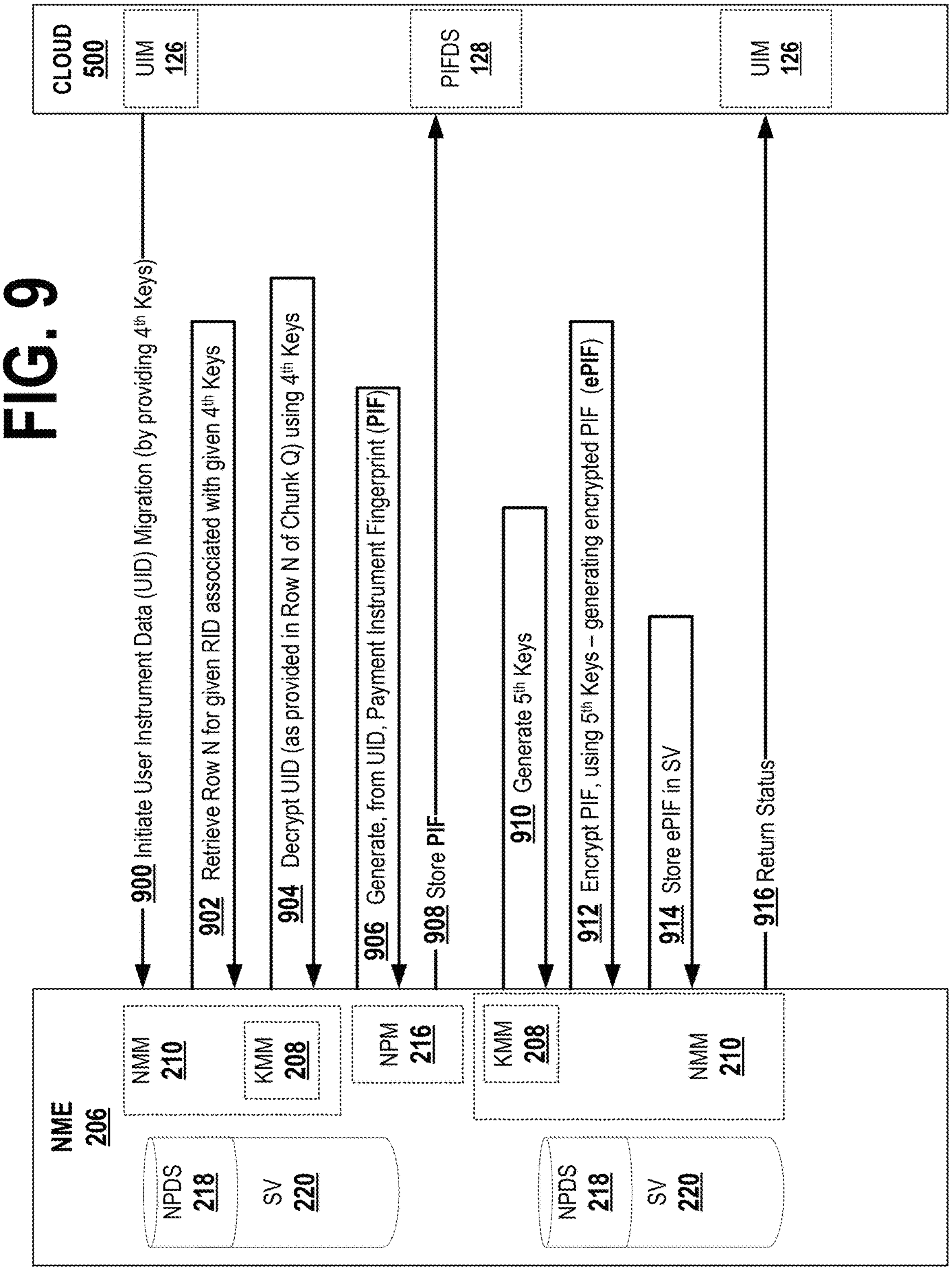
FIG. 9 is a flow chart illustrating a process for PCI compliant migration of user instruments identifiable from the PID exported from the EPCI-CDE to the NPCI-CDE into one or more user accessible systems for use by the user with the new vendors payment systems and processes and in accordance with at least one implementation of the present disclosure.

The Cloud 120 may include a user instrument migrator (UIM) 126. The UIM 126 may be a separate server utilized by an operator of the NPCI-CDE to facilitate financial transactions using the CUD provided in one or more of the PTF files transferred from the EPCI-CDE 300 to the NPC-CDE 200. For at least one implementation, the UIM 126 may be provided by an online sports betting company, such as DraftKings, Inc. of Boston, MA USA. One or more of the operations performed by the UIM 126 are illustrated in FIGS. 8 and 9 and are further described below.

The Cloud 120 may include a payment instrument fingerprint data store (PIFDS) 128. One or more of the operations performed by the PIFDS 128 are illustrated in FIGS. 5, 6 and 7 and are further described below.

New PCI Controlled Data Environment (NPCI-CDE) 200

Figure 2:
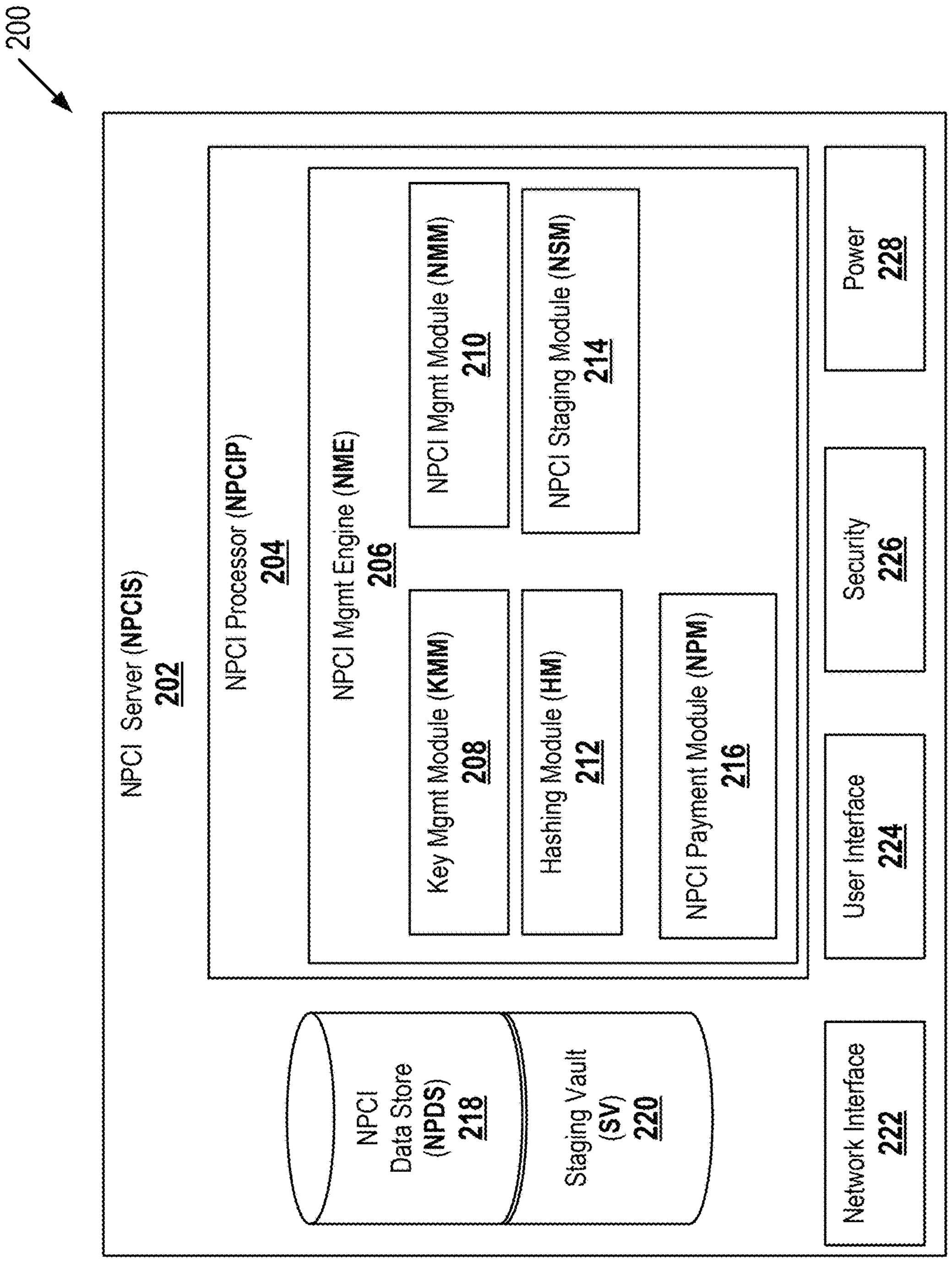
FIG. 2 is a schematic illustration for a new PCI server utilized in an implementation of the secure data transfer system of FIGS. 1A and 1*n* accordance with at least one implementation of the present disclosure.

As shown in FIG. 2 and for at least one implementation, an NPCI-CDE 200 may include an NPCI server (NPCIS) 202 that includes an NPCI processor (NPCIP) 204 which executes non-transient computer instructions, stored in an NPCI data store (NPDS) 218, for instantiating an NPCI management engine (NME) 206. The NPDS 218 may include a logically and/or physically separate data store, herein a staging vault (SV) 220—the use of which (for at least one implementation) is illustrated in FIGS. 6, 8 and 9 and is further described below.

For at least one implementation, the NME 206 may configure one or modules (as defined above) which support the PCI compliant migration of PID from the EPCI-CDE 300 to the NPCI-CDE 200. As shown in FIG. 2, such modules may include an NPCI key management module (KMM) 208, an NPCI management module (NMM) 210, an NPCI hashing module (NHM) 212, an NPCI staging module (NSM) 214, and an NPCI payment module (NPM) 216. One or more of the operations performed by the KMM 208, NMM 210, NHM 212, NSM 214, and NPM 216 are illustrated in FIGS. 5, 6, 7, 8 and 9 and are further described below.

As further shown in FIG. 2 and for at least one implementation, the NPCIS 202 may include a communications interface 222 that respectively couples the NPCIS 202 (and thereby the NPCI-CDE 200) with the other system 100 components. The NPCIS 202 may further include one or more user interfaces 224, security 226, power 228, a bus (not shown), and other commonly utilized components for one or more computers and/or computer servers.

Existing PCI Controlled Data Environment (EPCI-CDE) 300

Figure 3:
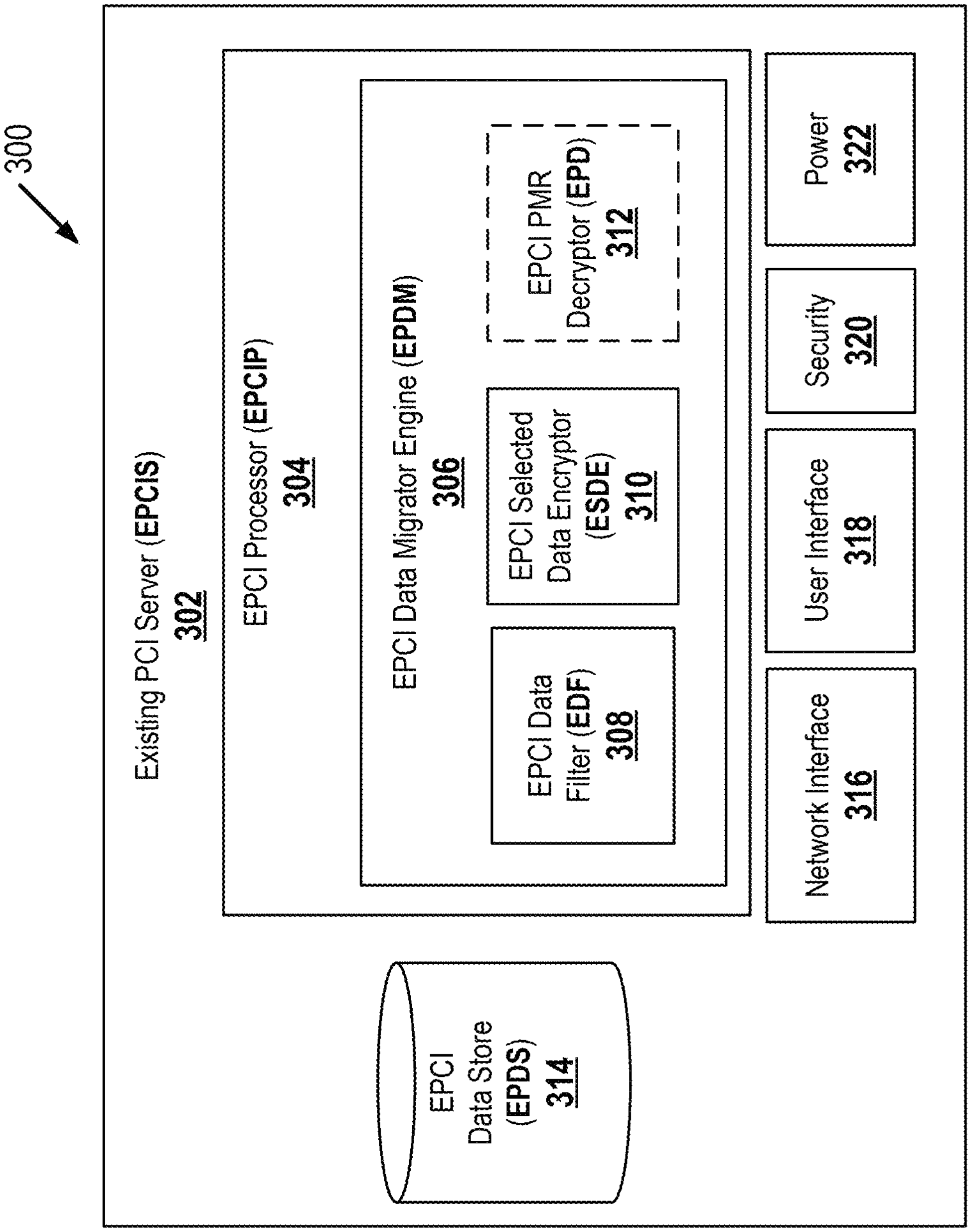
FIG. 3 is a schematic illustration of an existing PCI server utilized in an implementation of the secure data transfer system of FIGS. 1A and 1*n* accordance with at least one implementation of the present disclosure.

As shown in FIG. 3 and for at least one implementation, an EPCI-CDE 300 may include an EPCI server (EPCIS) 302 that includes an EPCI processor (EPCIP) 304 which executes non-transient computer instructions, stored in an EPCI data store (EPDS) 314, for instantiating an EPCI data migration engine (EPDM) 306

For at least one implementation, the EPDM 306 may configure one or modules (as defined above) which support the PCI compliant migration of PID from the EPCI-CDE 300 to the NPCI-CDE 200. As shown in FIG. 3, such modules may include an EPCI data filter (EDF) 308, an EPCI Selected Data Encryptor (ESDE) 310, and an (optional) EPCI PMR decryptor (EPD) 312. The EPD 312 may be utilized when the PMR is sent from the NPCIS 202 to the EPCIS 303 in an encrypted or otherwise secure data transfer format. One or more of the operations performed by the EPDM 306, EDF 308, and ESDE 310 are illustrated in FIG. 7 and are further described below.

As further shown in FIG. 3 and for at least one implementation, the EPCIS 302 may include a network interface 316 that respectively couples the EPCIS 302 (and thereby the EPCI-CDE 300) with the other system 100 components. The EPCIS 302 may further include one or more user interfaces 318, security 320, power 322, a bus (not shown), and other commonly utilized components for one or more computers and/or computer servers.

Key Management System 400

As shown in FIG. 1A, the system 100 may include a key management system (KMS) 400. The KMS 400 may be configured to securely generate and/or store one or more encryption keys including, but not limited to, asymmetric keys and symmetric keys. For at least one implementation, the KMS 400 may be implemented by an AWS KEY MANAGEMENT SERVICE provided by Amazon Web Services, Inc. of Seattle, Washington USA. One or more of the operations performed by the KMS 400 are illustrated in FIGS. 5, 6 and 7 and are further described below.

Figure 4:
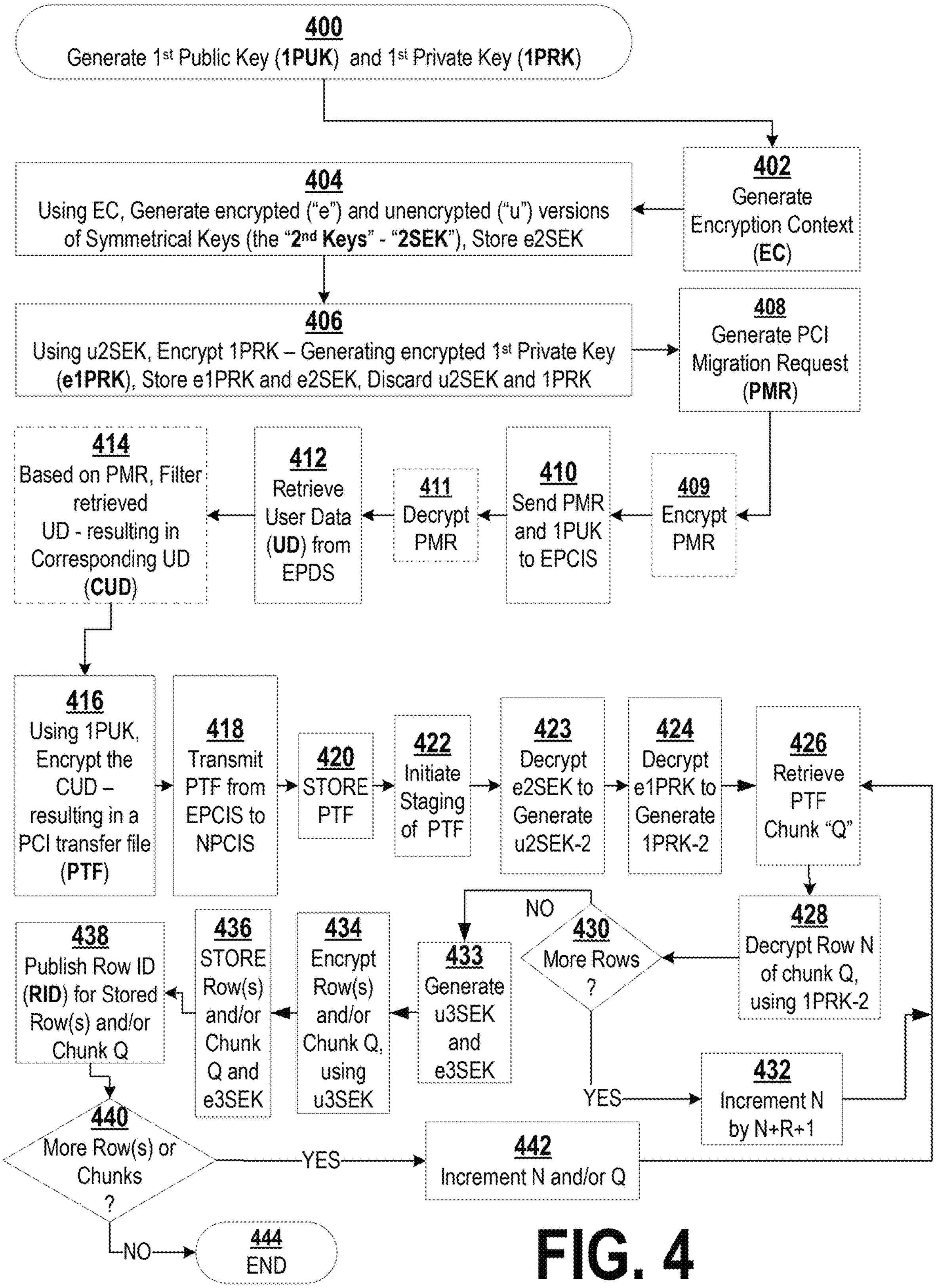
FIG. 4 is a flow chart illustrating a process for migrating PID from an EPCI-CDE to an NPCI-CDE and in accordance with at least one implementation of the present disclosure.

As shown in FIG. 4 and for at least one implementation of the present disclosure, a process for securely migrating PID from an EPCI-CDE to an NPCI-CDE may include, as per Operation 400, the generation of a first set of security keys (herein, the "$1^{st}$ Keys"). For at least one implementation, the $1^{st}$ Keys may be asymmetric keys and may include a first public key (1PUK) and a first private key (1PRK).

As per Operation 402 and for at least one implementation, the process may include generating an encryption context (EC). For at least one implementation, the EC identifies a controlled data storage environment (herein, "a controlled data store"), under the direction, management and/or control of the NPCI-CDE, in which one or more portions of the PCI transfer file (PTF) (as further described below) is to be stored. The EC may also specify the controlled data store as the data store for the $1^{st}$ Keys, and/or the $3^{rd}$-$5^{th}$ Keys (as described below). The controlled data store may be managed by the NPCI-CDE 200, such as the NPDS 218 and the SV 220, by a Cloud 120 system and/or server, such as the 2SFT 124, or otherwise. For at least one implementation, the EC may identify one or more intermediary data stores, such as the 1SFT 122 and 2SFT 124, used to transfer the PTF from the EPCI-CDE 300 to the NPCI-CDE 200. For at least one implementation, the EC may be generated based on a storage location in the NPDS 218 at which the PII is to be stored. For another implementation, the EC may be generated based on a storage location provided by the NPCI-CDE 200, the Cloud 120 or otherwise. For at least one implementation, the EC may be randomly generated by the NME 206.

As per Operation 404 and for at least one implementation, the process may include using the EC to generated a second set of encryption keys (collectively, the "$2^{nd}$ Keys"). For at least one implementation, the $2^{nd}$ Keys may be symmetric keys and/or asymmetric keys. For at least one implementation, the $2^{nd}$ Keys may be generated by the KMM 208 as symmetrical encryption keys (SEK), including an unencrypted version ("u") and an encrypted version ("e"), herein identified as the unencrypted second SEK (u2SEK) and the encrypted second SEK (e2SEK). For at least one implementation, the e2SEK may be stored by the KMM 208 in the NPDS 218 and/or the SV 220. For at least one implementation, the u2SEK may be discarded after use (as describe below).

As per Operation 406 and for at least one implementation, the process may include using the u2SEK to encrypt the 1PRK and thereby generate an encrypted 1PRK (herein, the "e1PRK"). The process may also include the KMM 208 storing, in the NPDS 218 or the SV 220, the e1PRK and the e2SEK. The process may also include the KMM 208 discarding the u2SEK and the 1PRK. Such discarding may occur by using any known or later arising technologies and/or processes by which data, as stored on a temporary or non-temporary basis, is permanently deleted.

As per Operation 408 and for at least one implementation, the process may include generating a PCI migration request (PMR). For at least one implementation, the PMR may identify at least one user data category (UDC).

As per Operation 409 and for at least one implementation, the process may optionally include encrypting the PMR. For at least one implementation, an optional set of encryption keys (the "Optional Keys"), which may asymmetric keys and/or symmetric keys, may be utilized to encrypt the PMR with a corresponding public key being provided to the NPCIS 202 by the EPCIS 302, which retains a corresponding private key and facilitates decryption of the PMR (as per Operation 411). In another implementation, the private key may be generated by the KMM 208 and separately and securely provided by the NPCIS 202 to the EPCIS 302. In another implementation, a set of symmetric keys may be utilized to encrypt and decrypt the PMR.

As per Operation 410 and for at least one implementation, the process may include transmitting the PMR and the 1PUK to the EPCIS 302. For at least one implementation when the PMR is encrypted using the Optional Keys, a communication of the private key to the EPCIS 302 may also occur.

As per Operation 411 and for at least one implementation and when the PMR is encrypted by the Optional Keys, the process may include the EPCIS 302 decrypting the PMR.

As per Operation 412 and for at least one implementation, the process may include retrieving user data (UD), from the EPDS 314. Any form, format, quantity and the like of UD may be retrieved, in a data form, from the EPDS 314. The type, quantity, specific instances and the like of the UD to be retrieved from the EPDS 314 may be designated in the PMR, determined by the EPCIS 302, pre-determined or otherwise specified.

As per Operation 414 and for at least one implementation, the process may optionally include filtering, based on the one or more UDCs set forth in the PMR, the UD retrieved, by the EPCIS 302, from the EPDS 314 with the filtering resulting in a set of corresponding user data (CUD).

As per Operation 416 and for at least one implementation, the process may include encrypting, using the $1^{st}$ Keys, the CUD to generate the PCI transfer file (PTF). For at least one implementation, the PTF includes at least one instance of CUD. Herein, for purposes of explanation, each instance of CUD provided in the PFT is identified as pertaining to a "row" of the PTF. The PTF may include multiple rows of CUD, and collections of such multiple rows are herein further identified, for purposes of explanation, as being provided and/or identified in one or more "chunks". It is to be appreciated that any number of rows, and chunks may be provided in a given PTF. For at least one implementation, the CUD may be encrypted using a single instance of the 1PUK. For other implementations, it is to be appreciated that multiple instances of 1PUKs may be used to encrypt, in whole or in part, the CUD. For example, a first row, first set of rows, first chunk and/or first set of chunks of the CUD may be encrypted using a first 1PUK while a second row, second set of rows, second hunk and/or second set of chunks of the CUD may be encrypted using a second (or nth) instance of the 1PUK, with second (or nth) instance of the $1^{st}$ Keys including a corresponding second (nth) 1PRK, that per Operation 404 may be encrypted by the $2^{nd}$ Keys or another iteration of the $2^{nd}$ Keys. It is to be appreciated that any number of $1^{st}$ Keys and/or $2^{nd}$ Keys may be used to encrypt any given row(s) and/or chunk(s) of CUD, as communicated in the PTF from the EPCI-CDE 300 to the NPCI-CDE 200.

As per Operation 418 and for at least one implementation, the process may include transmitting the PTF from the EPCIS 302 to the NPCIS 202.

As per Operation 420 and for at least one implementation, the as transmitted PTF may be received by the NME 206 and stored in a storage device accessible to the NME 206. For at least one implementation, one or more intermediary servers, such as the 1SFT 122 and the 2SFT 124, may be utilized to store the PTF. Such intermediary servers may be utilized to provide physical, logical, and other separations between operations performed by the EPCI-CDE 300 on the PCI data contained in the PTF from operations performed by the NPCI-CDE 200 on such PCI data.

As per Operation 422 and for at least one implementation, the process may include initiating staging of the PTF. For at least one implementation, such initiation may be executed by the NME 206. For at least one implementation, staging of the PTF may include first determining the PTF size as having "N" unique CUD entries, which are also referred to herein as rows, and "M" total CUD entries (which are also referred to herein total rows). Based on N and M, staging may further include segmenting the PTF into "Q" chunks; wherein each chunk Q includes "R" rows, each row corresponds to a unique instance of the CUD in the PTF, and "T" total chunks are utilized to include each of the CUDs in the PTF; and wherein N, M, Q, R and T are each integers.

As per Operation 423 and for at least one implementation, the process may include retrieving and decrypting the previously stored e2SEK to generate an unencrypted second version of the u2SEK (u2SEK-2). It is to be appreciated that generation of the u2SEK-2 may occur at any time during the process of FIG. 4 prior to an actual decryption of a given row N of the PTF, as occurs per Operation 428. For at least one implementation, wherein a PTF is encrypted in multiple parts and using multiple PUKs and/or multiple SEKs are used to encrypt the PRKs corresponding to the multiple PUKs, it is to be appreciated that Operation 423 may be repeated, as necessary, to decrypt one or more of the multiple parts of the PTF.

As per Operation 424 and for at least one implementation, the process may include decrypting the e1PRK. For at least one implementation, the u2SEK-2 generated by Operation 423 may be utilized to decrypt the e1PRK. The as decrypted e1PRK generates a second instance of the 1PRK (herein, the "1PRK-2"). The 1PRK and the 1PRK-2 are identical, as intended for use in decrypting one or more rows N of the PTF. It is to be appreciated that the 1PRK and 1PRK-2 may include additional data, e.g., data identifying when the 1PRK or 1PRK-2 was generated, or the like that distinguishes the 1PRK from the 1PRK-2. But for purposes of PTF decryption, the 1PRK and 1PRK-2 are identical.

As per Operation 426 and for at least one implementation, the process may include retrieving chunk Q (with Q being initially set to "1" for at least one implementation) of the PTF from the storage used to store the PTF (as per Operation 420).

As per Operation 428 and for at least one implementation, the process may include decrypting each of rows N (N initially set to 1) of rows N to R in chunk Q of the CUD received in the PTF. For at least one implementation, the 1PRK-2 is used to decode each of Rows N. For at least one implementation, a single row N may be decrypted. For another implementation, multiple rows, including up to R rows, may be decrypted using a given instance of the 1PRK-2.

As per Operation 430 and for at least one implementation, the process may include determining if more rows N of the CUD, in chunk Q, need to be decrypted? If "YES," the process may proceed to Operation 432. If "NO," the process may proceed to Operation 434.

As per Operation 432 and for at least one implementation, the process may include incrementing N by 1 or another integer when R refers to more than one row and multiple rows have been decrypted during a given iteration of Operation 428. For at least one implementation wherein R rows are decrypted in a given iteration of Operation 482, N may be incremented by N+R+1. When all rows to be decrypted have been decrypted, the process proceeds to Operation 433.

As per Operation 433 and for at least one implementation, the process may include generating a third set of keys (the "$3^{rd}$ Keys"). For at least one implementation, the $3^{rd}$ Keys generated may be SEKs. For at least one implementation, the $3^{rd}$ Keys may include an unencrypted $3^{rd}$ SEK (u3SEK) and an encrypted $3^{rd}$ SEK (e3SEK). For at least one implementation, multiple instances of the $3^{rd}$ Keys may be generated.

As per Operation 434 and for at least one implementation, the process may include encrypting the chunk Q. For at least one implementation, chunk Q may be encrypted using a given instance (when more than one is to be utilized) of the u3SEK.

As per Operation 436 and for at least one implementation, the process may include storing the row(s) and/or chunk(s) Q of UD in a data store accessible to the NPCI-CDE 300. For at least one implementation, as discussed below with regards to FIGS. 8-9, the row(s) and/or chunk Q of UD may be stored in a separate data store, as User Instrument Data (UID). For at least one implementation, the UD (and/or UID) may include UD that facilitates a financial transaction (with non-limiting examples of the UD and UID including a credit card number, date of expiration, username and security code). The UD may be separately stored in the SV 220 as UID that may be accessed using another set of security keys which provide logical and cryptological separation between UID stored in a more readily accessible portion of the SV 200 and other instances of the UD stored in another less accessible data stores, such as the NPDS 218, and/or other portions of the SV 200.

As per Operation 438 and for at least one implementation, the process may include publishing, in a look-up table or the like, a row ID (RID) that identifies, in one or more of a given row and/or a given chunk, a given instance of the UD (and/or the UID, as the case may be). Such RID may include one or more instances of UD which identify a given user, with non-limiting examples including a username, user sign-on, or the like.

As per Operation 440 and for at least one implementation, the process may include determining whether more rows and/or chunks of CUD exist in the PTF. For at least one implementation, multiple u3SEKs may be utilized to encrypt (and decrypt) one or more rows and/or chunks of the CUD in the PTF. It is to be appreciated that Operations 433-442 may be repeated to accomplish encryption of rows and/or multiple rows, and/or chunks of the CUD in the PTF. If "YES," the process may proceed to Operation 442 and then Operations 426-442 until each of the T chunks of the CUD in the PTF has been processed. If "NO," the process may proceed to Operation 444.

As per Operation 442 and for at least one implementation, the process may include incrementing N and/or Q, with N being incremented when unique instances of the e3SEK are to be utilized and Q being incremented when additional chunks of CUD in the PTF are to be processed.

As per Operation 444 and for at least one implementation, the process may end.

As shown in FIG. 5, a PCI compliant process for generating secure encryption keys utilized when migrating PID from an EPCI-CDE 300 to an NPCI-CDE 200 may include, as per Operation 500, the DMSE 106 instructing the NME 206 to initiate generation of the $1^{st}$ Keys.

As per Operation 502 and for at least one implementation, the process may include the KMM 208, of the NME 206, generating the 1PUK and the 1PRK.

As per Operation 504 and for at least one implementation, the process may include the DMSE 106 providing one or more operational parameters (OPPS) that are to be used to govern which of the unique instance of PCI data stored by the EPCI-CDE 300 are to be migrated to the NPCI-CDE 200. For at least one implementation, Operations 500 and 504 may occur substantially simultaneously. For another implementation, Operation 504 may occur before Operation 502.

As per Operation 506 and for at least one implementation, the process may include the KMM 208 generating the encryption context (EC). For at least one implementation, the KMM 208 generates the EC based on the OPPS provided by the DMSE 106.

As per Operation 508 and for at least one implementation, the process may include the KMM 208 sending a request, to the KMS 400, for the KMS 400 to generate the $2^{nd}$ Keys. It is to be appreciated that for at least one implementation, the KMS 400 may be configured to generate the $2^{nd}$ Keys using a highly secure data store that is not accessible by users other than those having administrator and/or equivalent or higher data access privileges as granted chief operating officer, or similarly dually appointed executive officer by the legal entity that owns and/or operates the NPCI-CDE 200.

As per Operation 510 and for at least one implementation, the process may include the KMS 400 generating encrypted and unencrypted versions of the $2^{nd}$ Keys, namely, the e2SEK and the u2SEK.

As per Operation 512 and for at least one implementation, the process may include the KMS 400 sending the e2SEK and the u2SEK to the NMM 210.

As per Operation 514 and for at least one implementation, the process may include the NMM 210 using the u2SEK to encrypt the 1PRK and thereby generate the encrypted 1PRK (e1PRK). For at least one implementation, the u2SEK may be discarded after being used to generate the e1PRK.

As per Operation 516 and for at least one implementation, the process may include the NHM 212 generating a globally unique identifier (GUID) for an encrypted storage token (EST). For at least one implementation, multiple ESTs may be used with a given EST corresponding to a given use of the $1^{st}$ Keys and/or the $2^{nd}$ Keys. For at least one implementation, the GUID may be generated using a hashing function based on the $1^{st}$ Keys and/or $2^{nd}$ Keys utilized. The use of hash functions and generation of hash values are well known in the art and any known or later developed technologies may be used to generate the hash values.

As per Operation 518 and for at least one implementation, the process may include the NMM 210 storing the EST, e2SEK and e1PRK using/based on the EST. For at least one implementation, the e2SEK and e1PRK may be stored in a data store accessible by the NME 206 such as the NPDS 218 and/or the SV 220.

As per Operation 520 and for at least one implementation, the process may include the NMM 210 storing the EST using/based on the OPPS. For at least one implementation, the EST may be stored in a data store accessible by the NME 206 such as the NPDS 218 and/or the SV 220.

As per Operation 522 and for at least one implementation, the process may include the NME 206 communicating the 1PUK to the DMSE 106. The 1PUK may be used to facilitate the migration of the CUD from the EPCI-CDE 300 to the NPCI-CDE 200 in accordance with the operations shown in one or more of FIGS. 4 and 6-9.

As shown in FIG. 6 and for at least one implementation, a PCI compliant process for retrieving secure encryption keys utilized when migrating PID from an EPCI-CDE 300 to an NPCI-CDE 200 may include, as per Operation 600, the DMSE 106 sending an "initiate 1PRK decryption" message 600 to the NME 206. For at least one implementation this message may include the OPPS (as previously provided by the DMSE 106 per Operation 504).

As per Operation 602 and for at least one implementation, the process may include the NMM 210 retrieving, from the NPDS 218, the EST. For at least one implementation, that GUID (which may be a hash value, as previously generated per Operation 516) may be used to identify the 1EST. For at least one implementation, the OPPS may be used to retrieve the 1EST.

As per Operation 604 and for at least one implementation, the process may include the NMM 210 retrieving, from the NPDS 218, the e2SEK and the e1PRK (as previously stored per Operation 518).

As per Operation 606 and for at least one implementation, the process may include the KMM 208 generating a second instance of the encryption context (EC-2) based on the OPPS. The EC and the EC-2 are identical.

As per Operation 608 and for at least one implementation, the process may include the KMM 208 sending a message to the KMS 400 requesting decryption of the e1SEK based on the EC-2.

As per Operation 610 and for at least one implementation, the process may include the KMS 400 decrypting the e2SEK using the EC-2 and generate a second instance of the u2SEK (the "u2SEK-2").

As per Operation 612 and for at least one implementation, the process may include the KMS 400 returning the u2SEK-2 to the KMM 208.

As per Operation 614 and for at least one implementation, the process may include the NMM 210 decrypting the e1PRK, using the u2SEK-2 and thereby generating the second instance of the 1PRK (the 1PRK-2).

As per Operation 616 and for at least one implementation, the 1PRK-2 may be suitably stored in the NPDS 218.

As shown in FIG. 7 and for at least one implementation, a PCI compliant process for migrating PID from an EPCI-CDE 300 to an intermediary server may include, as per Operation 700, the DMSE 106 sending the 1PUK and the PMR in a message to the EPCIS 302.

As per Operation 702 and for at least one implementation, the process may include the EPDM 306 retrieving user data (UD) from the EPDS 314.

As per Operation 704 and for at least one implementation, the process may include the EPDF 308 filtering the retrieved UD, as identified in the PMR by one or more UDCs, to identify corresponding user data (CUD).

As per Operation 706 and for at least one implementation, the process may include the ESDE 310 encrypting the CUD, using the 1PUK, and thereby generating a PCI transfer file (PTF).

As per Operation 708 and for at least one implementation, the process may include the EPCIS 302 sending the PTF for storage at the 1SFT 122. For at least one implementation, the 1SFT 122 may be provided on the Cloud 120 and/or by a data storage device and/or storage system that is operated, located (virtually and physically) separate and/or independently of the EPCI-CDE 300.

As per Operation 710 and for at least one implementation, the process may include the EPCIS 302 sending a "PTF stored" message 710 to the DMSE 106.

As per Operation 712 and for at least one implementation, the process may include the DMSE 106 sending an "Initiate PTF migration" message to the 1SFT 122.

As per Operation 714 and for at least one implementation, the process may include the 1SFT 122 transferring the PTF to the 2SFT 124. It is to be appreciated that transfer of the PTF from the 1SFT 122 to the 2SFT 124 places the PTF in a data store under the direction and control of the NPCI-CDE 200. The 2SFT 124 may be designated by the NPCI-CDE 200 in the PMR, be previously designated, or otherwise designated.

As per Operation 716 and for at least one implementation, the process may include the 2SFT 124 sending a "Ready for Migration" message to the NME 206. The Ready for Migration message may be sent when all or one or more parts of the PTF is transferred to the 2SFT 124.

As per Operation 718 and for at least one implementation, the process may include the NSM 214 determining the size of the PTF. For at least one implementation, the PTF file size may be delineated in terms of "N" unique CUD entries, which may correspond to rows in the PTF data file, and "M" total entries, which may correspond to a total number of rows in the PTF data file. Other methods of delineation of the PTF file size may be used for other implementations.

As per Operation 720 and for at least one implementation, the process may include the NSM 214 determining a number of row "R" for each chunk "Q" and the total number of chunks "T" for the PTF.

As per Operation 722 and for at least one implementation, the process may include the NSM 214 sending, to the 2SFT 124, a request a first row N, where N initially equals one (1), in the PTF. For at least one implementation, N may correspond to two or more rows in the PTF.

As per Operation 724 and for at least one implementation, the process may include the 2SFT 124 sending the requested row "N" of the PTS to the NSM 214.

As per Operation 726 and for at least one implementation, the process may include the NSM 214 decrypting the received row "N" using the 1PRK-2. The 1PRK-2 was previously generated per Operation 614.

As per Operation 728 and for at least one implementation, the process may include the NSM 214 repeating Operations 724-728 until all the rows (N→M) for the given chunk Q for the PTF are retrieved from the 2SFT 124. It is to be appreciated that the Operations recited in FIG. 7 may be performed in serial, parallel, using distributed computing and/or storage resources, or otherwise. The process may then proceed to the Operations depicted in FIG. 8 and described below.

As shown in FIG. 8 and for at least one implementation, as per Operation 800, a PCI compliant process for migrating PID from the intermediary server of FIG. 7 to the NPCI-CDE 200, using a staged migration process, may further include generating a set of $3^{rd}$ Keys ($3^{rd}$ Keys) that may be utilized to encrypt and decrypt one or more rows of CUD in the PTF. For at least one implementation, the $3^{rd}$ Keys may be symmetrical keys (SEKs) and may include an encrypted 3SEK (e3SEK) and an unencrypted 3SEK (u3SEK). For at least one implementation, multiple instances ("Z"), with Z being an integer, of the $3^{rd}$ Keys may be generated, such keys being identified herein as Ze3SEK and Zu3SEK. For at least one implementation, a unique instance Z of the $3^{rd}$ Keys may be generated for use with each Row N of the PTF. For another implementation, a unique instance Z of the $3^{rd}$ Keys may be generated for use with multiple rows N, a chunk, and/or multiple chunks Q of the PTF. For at least one implementation, the KMM 208 may generate the $3^{rd}$ Keys. For another implementation, the KMS 400 may generate the $3^{rd}$ Keys.

As per Operation 801 and for at least one implementation, the process may include encrypting one or more rows N of CUD, as provided in the PTF, using the Zu3SEK.

As per Operation 802 and for at least one implementation, the process may include storing the encrypted row(s) and/or chunk(s) in the SV 220. The process may further include storing the Ze3SEK used to encrypt the given row(s) and/or chunk(s) of CUD, as provided in the PFT, in the SV 220. For at least one implementation, the SV 220 may be a partitioned area of the NPDS 218. For another implementation, the SV 220 may be a separate data store under the direction and control of the NPCIS 202.

As per Operation 804 and for at least one implementation, the process may include the SV 220 returning, to the NSM 214, a Row Identifier ("RID") for the stored encrypted row(s) and/or chunk(s) of CUD. For at least one implementation, each instance of CUD, as may be designated by one or more rows in the RTF, may be associated with a unique RID.

As per Operation 806 and for at least one implementation, the process may include the NSM 214 publishing the RID(s) for each of the encrypt rows and/or chunks of the CUDs, provided in the PTF, to the User Instrument Migrator (UIM) 126.

As per Operation 808 and for at least one implementation, the process may optionally include, upon receipt of the RIDs, the UIM 126 utilizing the RID information to identify, in a ledger, spreadsheet, data table, or otherwise, the location of encrypted CUD, that may be utilized in facilitating electronic financial transactions by a user associated therewith and a vendor, such as DRAFTKINGS.

As per Operation 810 and for at least one implementation, the process may include incrementing one or more of Z, Q, N and RID.

As per Operation 812 and for at least one implementation, the process may include, while N<M, repeating Operations 816 to 828.

As per Operation 814 and for at least one implementation, the process may include, when N=M, performing Operation 816 to 828 once more and then ending the staging process.

As per Operation 816 and for at least one implementation, the process may include asynchronous operations that may include the NMM 206 reading a RID. The reading of the RID may occur at any time after the encrypted row(s) and/or chunk(s) corresponding to the RID have been stored in the SV 220, and the RID thereof returned, as per Operations 802-814.

As per Operation 818 and for at least one implementation, the process may include the NMM 210 asynchronously retrieving the encrypted, stored chunk Q for an RID read per Operation 816 from the SV 220. The process may also include retrieving the Ze3SEK from storage.

As per Operation 820 and for at least one implementation, the process may include the NMM 210 asynchronously decrypting the retrieved row(s) and/or chunk(s) corresponding to the read RID. As shown, the KMM 208 may be utilized to provide the Ze3SEK that corresponds to the Zu3SEK utilized per Operation 800 to encrypt the given row(s) and/or chunk(s).

As per Operation 822 and for at least one implementation, the process may include the NMM 210 requesting and receiving, from the UIM 126, a new account number (NAN) for the given, as decrypted, RID. For at least one implementation, the NAN may be associated with a vendor with respect to which the CUD may be utilized to facilitate an electronic financial transaction.

As per Operation 823 and for at least one implementation, the process may include validating and/or formatting the unencrypted row(s) and/or chunk(s) of CUD(s) decrypted per Operation 820.

As per Operation 824 and for at least one implementation, the process may include the NMM 210, using $4^{th}$ encryption keys (the "$4^{th}$ Keys"), the given row(s) and/or chunk(s) of CUD(s) decrypted per Operation 820. For at least one implementation, the $4^{th}$ Keys may be SEKs, may be generated by the KMM 208 based on the NAN and may include an encrypted $4^{th}$ 4SEK (e4SEK) and an unencrypted $4^{th}$ SEK (u4SEK).

As per Operation 826 and for at least one implementation, the process may include the NMM 210 storing the encrypted row R, as encrypted per Operation 824, in the NPDS 218.

As per Operation 828 and for at least one implementation, the process may include repeating Operations 816-828 for each row R in a given chunk Q for a next RID.

As shown in FIG. 9 and for at least one implementation, a process for PCI compliant migration of user instruments identifiable from the PID exported from the EPCI-CDE 300 to the NPCI-CDE 200 into one or more user accessible systems for use by the user with the new vendors payment systems and processes may include, as per Operation 900, the UIM 126 initiating user instrument data (UID) migration by providing a given $4^{th}$ Keys to the NME 206.

As per Operation 902 and for at least one implementation, the process may include the NMM 210 retrieving row R, in a given chunk Q of the CUD(s), as identified by a given RID, and associated with a given $4^{th}$ Key.

As per Operation 904 and for at least one implementation, the process may include the NMM 210, using the $4^{th}$ Keys, decrypting the UID (as provided in given row N of the given chunk Q).

As per Operation 906 and for at least one implementation, the process may include the NPM 216 generating, from the decrypted UID, a payment instrument fingerprint (PIF).

As per Operation 908 and for at least one implementation, the process may include the NPM 216 sending the PIF to the PIFDS 128 for storage thereby.

As per Operation 910 and for at least one implementation, the process may include the KMM 208 generating a fifth key set (the "$5^{th}$ Keys"). The $5^{th}$ Keys may be SEKs. The $5^{th}$ Keys may be randomly generated by the KMM 208. The $5^{th}$ Keys may include an encrypted $5^{th}$ SEK (e5SEK) and an unencrypted $5^{th}$ SEK (u5SEK).

As per Operation 912 and for at least one implementation, the process may include the NMM 210 encrypting the PIF, using the $5^{th}$ Keys, resulting in an encrypted PIF (ePIF).

As per Operation 914 and for at least one implementation, the process may include the NMM 210 storing the ePIF in the SV 220.

As per Operation 916 and for at least one implementation, the process may include the NMM 210 sending a "Return Status" message, to the UIM 126, that identifies the storage location of the ePIF in the SV 220 so that the ePIF data may be used for future financial transactions.

The operations identified in FIGS. 4-9 are provided herein for illustrative purposes, are not intended to be limiting, and may be performed (if at all) in any order, sequence, combination, permutation, or otherwise as may be applicable to a given implementation of the present disclosure.

Although various implementations have been described above with a degree of particularity, or with reference to one or more individual implementations, those skilled in the art could make alterations to the disclosed implementations without departing from the spirit or scope of the present disclosure. The use of the terms "approximately" or "substantially" means that a value of an element has a parameter that is expected to be close to a stated value or position. As is well known in the art, there may be minor variations that prevent the values from being as stated. Accordingly, anticipated variances, such as 10% differences, are reasonable variances that a person having ordinary skill in the art would expect and know are acceptable relative to a stated or ideal goal for one or more implementations of the present disclosure. It is also to be appreciated that the terms "top" and "bottom," "left" and "right," "up" or "down," "first," "second," "next," "last," "before," "after," and other similar terms are used for description and ease of reference purposes and are not intended to be limiting to any orientation or configuration of any elements or sequences of operations for the various implementations of the present disclosure. Further, the terms "coupled," "connected" or otherwise are not intended to limit such interactions and communication of signals between two or more devices, systems, components or otherwise to direct interactions; indirect couplings and connections may also occur. Further, the terms "and" and "or" are not intended to be used in a limiting or expansive nature and cover any possible range of combinations of elements and operations of an implementation of the present disclosure. Other implementations are therefore contemplated. It is intended that matter contained in the above description and shown in the accompanying drawings be interpreted as illustrative of implementations and not limiting. Changes in detail or structure may be made without departing from the basic elements of the present disclosure as described in the following claims.

What is claimed is:

1. A process, for migrating controlled data from an existing controlled data environment (CDE) to a new CDE, comprising:

generating first security keys ("1$^{st}$ Keys");

wherein the 1$^{st}$ Keys include a first public key (1PUK) and a first private key (1PRK);

generating an encryption context (EC);

generating, based on the EC, second security keys ("2$^{nd}$ Keys");

wherein the 2$^{nd}$ Keys include an encrypted 2$^{nd}$ Key (e2SEK) and an unencrypted 2$^{nd}$ Key (u2SEK);

encrypting, using the u2SEK, the 1PRK to generate an encrypted 1PRK ("e1PRK");

generating a migration request;

wherein the migration request requests transfer of controlled data from an existing data store (EDS) to a new data store (NDS);

wherein the EDS is controlled by the existing CDE; and wherein the NDS is controlled by the new CDE;

communicating, by the new CDE, the migration request and the 1PUK to the existing CDE;

wherein, the existing CDE utilizes the 1PUK to encrypt the controlled data and output encrypted controlled data in a transfer file;

wherein the encrypted controlled data in the transfer file includes corresponding user data (CUD) set forth in two or more rows;

receiving the transfer file from the existing CDE;

upon receiving the transfer file:

decrypting the transfer file; and storing the transfer file in the NDS;

wherein the decrypting of the transfer file, uses a second instance of the 1PRK (1PRK-2), to generate a second instance of the controlled data and further comprises operations including:

generating third security keys ("3$^{rd}$ Keys"); and for a given row of the two or more rows in the transfer file:

separately decrypting the given row to generate a given row of unencrypted CUD;

re-encrypting, using the 3$^{rd}$ Keys, the given row of unencrypted CUD to generate a given 3$^{rd}$ Key encrypted row of CUD;

storing the given 3$^{rd}$ Key encrypted row of CUD in a staging vault (SV);

publishing a row identifier (RID) for the, as stored, given 3$^{rd}$ Key encrypted row of CUD; and repeating the operations above for each of the two or more rows; and wherein a third transfer of the transfer file further comprises:

segmenting the transfer file into two or more chunks; and wherein a given chunk of the two or more chunks includes at least one row of the two or more rows in the transfer file.

2. The process of claim 1, wherein the 1$^{st}$ Keys are asymmetrical keys; and wherein the 2$^{nd}$ Keys are symmetrical keys.

3. The process of claim 2, wherein the 2$^{nd}$ Keys are generated by a key management system (KMS); and wherein the KMS is operated independently of the existing CDE and the new CDE.

4. The process of claim 3, wherein the EC identifies the NDS as a designated storage location for the transfer file.

5. The process of claim 4, wherein, after the operation of encrypting the 1PRK to generate the e1PRK, the process further comprises:

discarding the 1PRK;

storing the e1PRK in a staging vault controlled by the new CDE; and storing the e2SEK in the staging vault.

6. The process of claim 5, wherein the receiving of the transfer further comprises:

receiving, by the new CDE from the existing CDE, a message indicating that a first transfer of the transfer file from an existing CDE data store (EDS) to a first secure file transfer data store (1SFT) associated with the existing CDE has occurred;

second instructing the 1SFT to second transfer the transfer file from the 1SFT to a second secure file transfer data store (2SFT) associated with the new CDE; and third instructing the 2SFT to third transfer the transfer file from the 2SFT to a staging vault associated with the new CDE.

7. The process of claim 1, wherein the encrypted controlled data in the transfer file includes corresponding user data (CUD);

wherein the CUD includes user data (UD) filtered, by the existing CDE, from multiple UD entries provided in the EDS; and wherein the CUD includes UD that corresponds to at least one criteria specified in the migration request.

8. The process of claim 1, wherein each row of the two or more rows includes personally identifiable data (PID) for a given user;

wherein the PID includes data that is payment card industry (PCI) compliant;

wherein the existing CDE is an existing PCI Compliant Controlled Data Environment (EPCI-CDE);

wherein the new CDE is a new PCI Compliant Controlled Data Environment (NPCI-CDE); and wherein the transfer file is a PCI compliant transfer file (PTF).

9. The process of claim 1, wherein the $3^{rd}$ Keys are symmetric keys and include an encrypted $3^{rd}$ Key (e3SEK) and an unencrypted $3^{rd}$ Key (u3SEK).

10. The process of claim 1, wherein each row in the transfer file includes personally identifiable data (PID) for a given user.

11. A process, for migrating controlled data from an existing controlled data environment (CDE) to a new CDE, comprising:

generating first security keys ("$1^{st}$ Keys");

wherein the $1^{st}$ Keys include a first public key (1PUK) and a first private key (1PRK);

generating an encryption context (EC);

generating, based on the EC, second security keys ("$2^{nd}$ Keys");

wherein the $2^{nd}$ Keys include an encrypted $2^{nd}$ Key (e2SEK) and an unencrypted $2^{nd}$ Key (u2SEK);

encrypting, using the u2SEK, the 1PRK to generate an encrypted 1PRK ("e1PRK");

generating a migration request;

wherein the migration request requests transfer of controlled data from an existing data store (EDS) to a new data store (NDS);

wherein the EDS is controlled by the existing CDE; and wherein the NDS is controlled by the new CDE;

communicating, by the new CDE, the migration request and the 1PUK to the existing CDE;

wherein, the existing CDE utilizes the 1PUK to encrypt the controlled data and output encrypted controlled data in a transfer file;

wherein the encrypted controlled data in the transfer file includes corresponding user data (CUD) set forth in two or more rows;

receiving the transfer file from the existing CDE;

upon receiving the transfer file:

decrypting the transfer file; and storing the transfer file in the NDS;

wherein the decrypting of the transfer file, uses a second instance of the 1PRK (1PRK-2), to generate a second instance of the controlled data and further comprises operations including:

generating third security keys ("$3^{rd}$ Keys"); and for a given row of the two or more rows in the transfer file:

separately decrypting the given row to generate a given row of unencrypted CUD;

re-encrypting, using the $3^{rd}$ Keys, the given row of unencrypted CUD to generate a given $3^{rd}$ Key encrypted row of CUD;

storing the given $3^{rd}$ Key encrypted row of CUD in a staging vault (SV);

publishing a row identifier (RID) for the, as stored, given $3^{rd}$ Key encrypted row of CUD; and repeating the operations above for each of the two or more rows; and wherein with respect to at least one given row of the two or more rows in the transfer file, the process further comprises:

reading the RID;

retrieving, from the SV, the given $3^{rd}$ Key encrypted row of CUD;

decrypting, using the $3^{rd}$ Keys, the given $3^{rd}$ Key encrypted row of CUD, to re-generate the given row of unencrypted CUD;

obtaining a new account number (NAN) for the given RID;

generating fourth security keys ($4^{th}$ Keys);

encrypting, using the $4^{th}$ Keys, the given row of unencrypted CUD to generate a given $4^{th}$ Key encrypted row of CUD; and storing the given $4^{th}$ Key encrypted row of CUD in the NDS.

12. The process of claim 11, wherein the $4^{th}$ Keys are symmetric keys and include an encrypted $4^{th}$ Key (e4SEK) and an unencrypted $4^{th}$ Key (u4SEK).

13. The process of claim 11, wherein with respect to at least one given row of the two or more rows in the transfer file, the process further comprises:

retrieving the given $4^{th}$ Key encrypted row of CUD from the NDS;

decrypting, using the $4^{th}$ Keys, the given $4^{th}$ Key encrypted row of CUD to generate user instrument data (UID);

generating, from the UID, a payment instrument fingerprint (PIF);

transmitting the PIF to a PIF data store (PIFDS);

generating fifth security keys ($5^{th}$ Keys);

encrypting the PIF, using the $5^{th}$ Keys, to generate an encrypted PIF (ePIF); and storing the ePIF in the SV.

14. The process of claim 13, wherein the $5^{th}$ Keys are symmetric keys and include an encrypted $5^{th}$ Key (e5SEK) and an unencrypted $5^{th}$ Key (u5SEK).

15. A process, for migrating controlled data from an existing controlled data environment (CDE) to a new CDE, comprising:

generating first security keys ("$1^{st}$ Keys");

wherein the $1^{st}$ Keys include a first public key (1PUK) and a first private key (1PRK);

generating an encryption context (EC);

generating, based on the EC, second security keys ("$2^{nd}$ Keys");

wherein the $2^{nd}$ Keys include an encrypted $2^{nd}$ Key (e2SEK) and an unencrypted $2^{nd}$ Key (u2SEK);

encrypting, using the u2SEK, the 1PRK to generate an encrypted 1PRK ("e1PRK");

generating a migration request;

wherein the migration request requests transfer of controlled data from an existing data store (EDS) to a new data store (NDS);

wherein the EDS is controlled by the existing CDE; and wherein the NDS is controlled by the new CDE;

communicating, by the new CDE, the migration request and the 1PUK to the existing CDE;

wherein, the existing CDE utilizes the 1PUK to encrypt the controlled data and output encrypted controlled data in a transfer file;

wherein the encrypted controlled data in the transfer file includes corresponding user data (CUD) set forth in two or more rows;

receiving the transfer file from the existing CDE;

upon receiving the transfer file:

decrypting the transfer file; and storing the transfer file in the NDS;

wherein the decrypting of the transfer file, uses a second instance of the 1PRK (1PRK-2), to generate a second instance of the controlled data and further comprises operations including:

generating third security keys ("$3^{rd}$ Keys"); and for a given row of the two or more rows in the transfer file:

separately decrypting the given row to generate a given row of unencrypted CUD;

re-encrypting, using the $3^{rd}$ Keys, the given row of unencrypted CUD to generate a given $3^{rd}$ Key encrypted row of CUD;

storing the given $3^{rd}$ Key encrypted row of CUD in a staging vault (SV);

publishing a row identifier (RID) for the, as stored, given $3^{rd}$ Key encrypted row of CUD; and repeating the operations above for each of the two or more rows;

wherein a third transfer of the transfer file further comprises:

segmenting the transfer file into two or more chunks; and wherein a given chunk of the two or more chunks includes at least one row of the two or more rows in the transfer file; and receiving at least one operational parameter (OPPS) for the new CDE; and wherein the EC is generated based on the OPPS.

16. The process of claim 15, further comprising:

generating a globally unique identifier for an encrypted storage token (EST);

storing, based on the EST, the e2SEK and the e1PRK; and storing, based on the OPPS, the EST in the NDS.

17. The process of claim 16, further comprising:

retrieving, based on the EST, the e2SEK and the e1PRK;

generating, based on the OPPS, generating a second instance of the EC (EC-2);

generating a second instance of the u2SEK (u2SEK-2) based on the EC-2; and wherein the decrypting of the transfer file further comprises:

decrypting, using the u2SEK-2, the e1PRK to generate a second instance of the 1PRK (1PRK-2);

decrypting the transfer file, using the 1PRK-2, to generate a second instance of the controlled data; and wherein the storing of the transfer file in the NDS further comprises storing the second instance of the controlled data in the NDS.

* * * * *